(12) United States Patent
Lu et al.

(10) Patent No.: US 11,681,117 B2
(45) Date of Patent: *Jun. 20, 2023

(54) LENS ASSEMBLY DRIVING MODULE, PHOTOGRAPHING SYSTEM AND CELL PHONE DEVICE

(71) Applicant: LARGAN DIGITAL CO., LTD., Taichung (TW)

(72) Inventors: Chun-Yi Lu, Taichung (TW); Te-Sheng Tseng, Taichung (TW); Wen-Hung Hsu, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 241 days.

This patent is subject to a terminal disclaimer.

(21) Appl. No.: 17/015,125

(22) Filed: Sep. 9, 2020

(65) Prior Publication Data
US 2020/0400917 A1    Dec. 24, 2020

Related U.S. Application Data

(63) Continuation of application No. 16/049,857, filed on Jul. 31, 2018, now Pat. No. 10,802,243.

(30) Foreign Application Priority Data

Mar. 8, 2018  (TW) ................. 107107941

(51) Int. Cl.
*G02B 7/09* (2021.01)
*G02B 13/00* (2006.01)
(Continued)

(52) U.S. Cl.
CPC ............ *G02B 7/09* (2013.01); *G02B 13/0045* (2013.01); *H02K 41/0354* (2013.01); (Continued)

(58) Field of Classification Search
CPC ........ G02B 7/09; G02B 13/0045; G02B 7/08; H02K 41/0354; H02K 41/0356; (Continued)

(56) References Cited

U.S. PATENT DOCUMENTS 7,701,651 B2    4/2010  Chang
9,696,515 B2    7/2017  Hsu
(Continued)

FOREIGN PATENT DOCUMENTS

CN    204101866 U    1/2015
CN    205899059 U    1/2017
(Continued)

*Primary Examiner* — Mohammed A Hasan
(74) *Attorney, Agent, or Firm* — McClure, Qualey & Rodack, LLP

(57) ABSTRACT

A lens assembly driving module includes a holder, a metal yoke, a lens unit, a magnet set, a coil, at least one elastic element and at least one damper agent. The metal yoke is coupled with the holder and includes a through hole and at least one extending structure. The extending structure is disposed around the through hole and extends along a direction from the through hole to the holder. The lens unit is movably disposed in the metal yoke. The lens unit includes an optical axis and at least one notch structure. The notch structure is disposed in an outer peripheral area of the lens unit and is corresponding to the extending structure. The damper agent is disposed between the extending structure of the metal yoke and the notch structure of the lens unit. The damper agent is applied to damp a movement of the lens unit.

15 Claims, 26 Drawing Sheets

(51) Int. Cl.
  *H02K 41/035* (2006.01)
  *H04M 1/02* (2006.01)
  *H04N 23/55* (2023.01)
  *H04N 23/62* (2023.01)
  *H04N 23/67* (2023.01)
  *H04N 23/69* (2023.01)

(52) U.S. Cl.
  CPC ....... *H02K 41/0356* (2013.01); *H04M 1/0264* (2013.01); *H04N 23/55* (2023.01); *H04N 23/62* (2023.01); *H04N 23/67* (2023.01); *H04N 23/69* (2023.01)

(58) Field of Classification Search
  CPC .............. H04M 1/0264; H04N 5/2254; H04N 5/23212; H04N 5/23216; H04N 5/23296; H04N 5/2257
  USPC .......................................................... 359/754
  See application file for complete search history.

(56) References Cited

U.S. PATENT DOCUMENTS

| | | | |
|---|---|---|---|
| 9,762,785 B2 | 9/2017 | Kim et al. | |
| 9,778,481 B2 | 10/2017 | Sato et al. | |
| 9,791,661 B2 | 10/2017 | Hayashi et al. | |
| 9,810,917 B2 | 11/2017 | Hubert et al. | |
| 9,854,144 B2 | 12/2017 | Park et al. | |
| 9,904,050 B2 | 2/2018 | Lin et al. | |
| 10,545,310 B2 | 1/2020 | Lu et al. | |
| 10,802,243 B2 * | 10/2020 | Lu | G02B 7/08 |
| 2007/0097340 A1 * | 5/2007 | Yuan | F16F 7/1005 355/75 |
| 2008/0037143 A1 * | 2/2008 | Yoon | G02B 7/08 359/824 |
| 2009/0252488 A1 * | 10/2009 | Eromaki | G02B 7/102 396/529 |
| 2015/0309282 A1 | 10/2015 | Lee et al. | |
| 2016/0070114 A1 | 3/2016 | Hubert et al. | |
| 2016/0109680 A1 | 4/2016 | Park et al. | |
| 2016/0209621 A1 | 7/2016 | Park et al. | |
| 2019/0278050 A1 * | 9/2019 | Lu | G02B 7/09 |
| 2020/0057242 A1 | 2/2020 | Osaka et al. | |

FOREIGN PATENT DOCUMENTS

| | | |
|---|---|---|
| TW | 200919063 A | 5/2009 |
| TW | 201604639 A | 2/2016 |

\* cited by examiner

LENS ASSEMBLY DRIVING MODULE, PHOTOGRAPHING SYSTEM AND CELL PHONE DEVICE

RELATED APPLICATIONS

The present application is a Continuation of U.S. application Ser. No. 16/049,857, filed on Jul. 31, 2018, issued on Oct. 13, 2020 as U.S. Pat. No. 10,802,243, which claims priority to Taiwan Application Serial Number 107107941, filed Mar. 8, 2018, which are incorporated by reference in their entireties.

BACKGROUND

Technical Field

The present disclosure relates to a lens assembly driving module and a photographing system. More particularly, the present disclosure relates to a lens assembly driving module and a photographing system applicable to a portable cell phone device.

Description of Related Art

With the popularity of personal electronic products and mobile communication products having camera functionalities, such as smart phones and tablet personal computers, the demand for compact electronic devices with high resolution and high image quality also increases significantly.

Nowadays, a lens assembly employed in an electronic device normally adopts a voice coil motor (VCM) as a driving apparatus for providing autofocus function. With an electromagnetic force generated by the interaction of magnets and a coil, and with the degree of freedom and the restoring force provided by springs which are required by the movement of the carrier carrying the lens assembly, the carrier is driven by the voice coil motor to bring the lens assembly to move along a direction parallel to an optical axis, so that the autofocus functionality of the lens assembly can be achieved.

For damping a movement of the lens assembly, a damper agent can be employed. However, limited by the mechanical arrangement, it is difficult for a conventional driving apparatus to control the coating amount and the coating efficiency of the damper agent. Accordingly, it is unfavorable for reducing the production cost, the production yield rate, and the production efficiency.

SUMMARY

According to one aspect of the present disclosure, a lens assembly driving module includes a holder, a metal yoke, a lens unit, a magnet set, a coil, at least one elastic element and at least one damper agent. The holder has an opening. The metal yoke is coupled with the holder. The metal yoke includes a through hole and at least one extending structure. The through hole is corresponding to the opening of the holder. The extending structure is disposed around the through hole, and the extending structure extends along a direction from the through hole to the holder. The lens unit is movably disposed in the metal yoke. The lens unit includes an optical axis and at least one notch structure. The optical axis is corresponding to the through hole. The notch structure is disposed in an outer peripheral area of the lens unit. The notch structure is corresponding to the extending structure. The magnet set is disposed in the metal yoke. The coil is disposed at an exterior of the lens unit, and the coil is corresponding to the magnet set. The elastic element is coupled with the lens unit and the holder. The damper agent is disposed between the extending structure of the metal yoke and the notch structure of the lens unit, wherein the damper agent is applied to damp a movement of the lens unit.

According to another aspect of the present disclosure, a photographing system includes the lens assembly driving module according to the aforementioned aspect.

According to further another aspect of the present disclosure, a cell phone device includes the photographing system according to the aforementioned aspect.

BRIEF DESCRIPTION OF THE DRAWINGS

The present disclosure can be more fully understood by reading the following detailed description of the embodiments, with reference made to the accompanying drawings as follows.

DETAILED DESCRIPTION

Figure 1A:
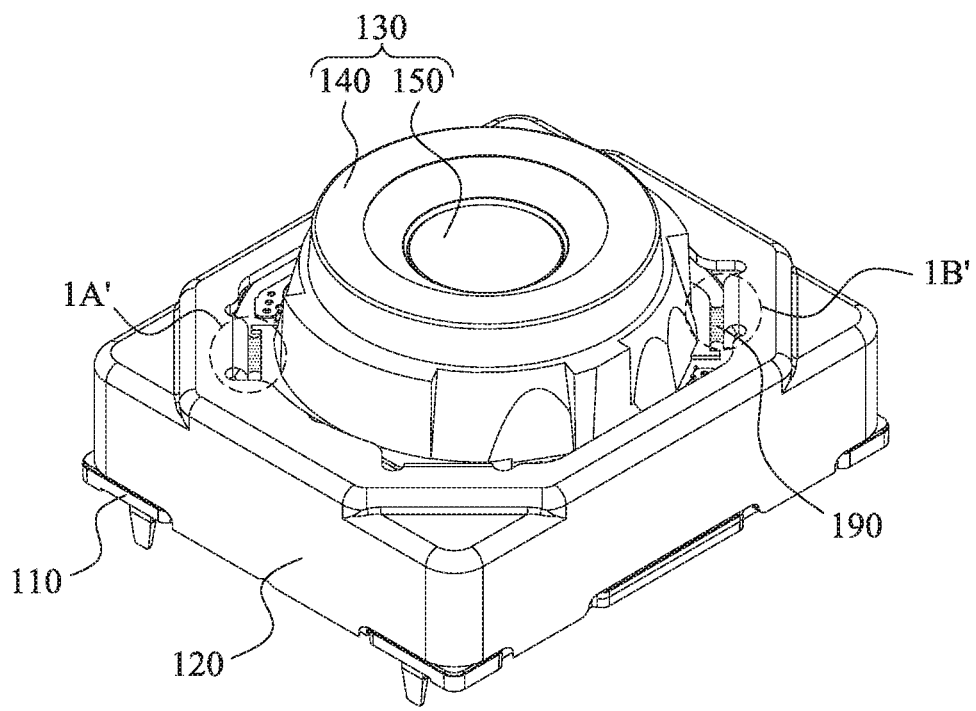
FIG. 1A is a three-dimensional view of a lens assembly driving module according to the 1st embodiment of the present disclosure.

According to the present disclosure, a damper precursor refers to a material of a damper agent before being cured via alight irradiation. That is, the damper agent is a product of the damper precursor being cured via the light irradiation. The damper precursor is in a liquid state, and the damper agent is in a gel state. Furthermore, because the damper agent is the product of the damper precursor being cured via the light irradiation, the coating amount and the coating efficiency of the damper agent also can be regarded as the coating amount and the coating efficiency of the damper precursor.

According to the present disclosure, the damper agent in the drawings is filled with dots, which is for easily identifying the damper agent and has no special meanings.

According to the present disclosure, the terms of "first" and "second" are for nomination, and thus do not represent sequential order or have special meanings.

1st Embodiment

Figure 1B:
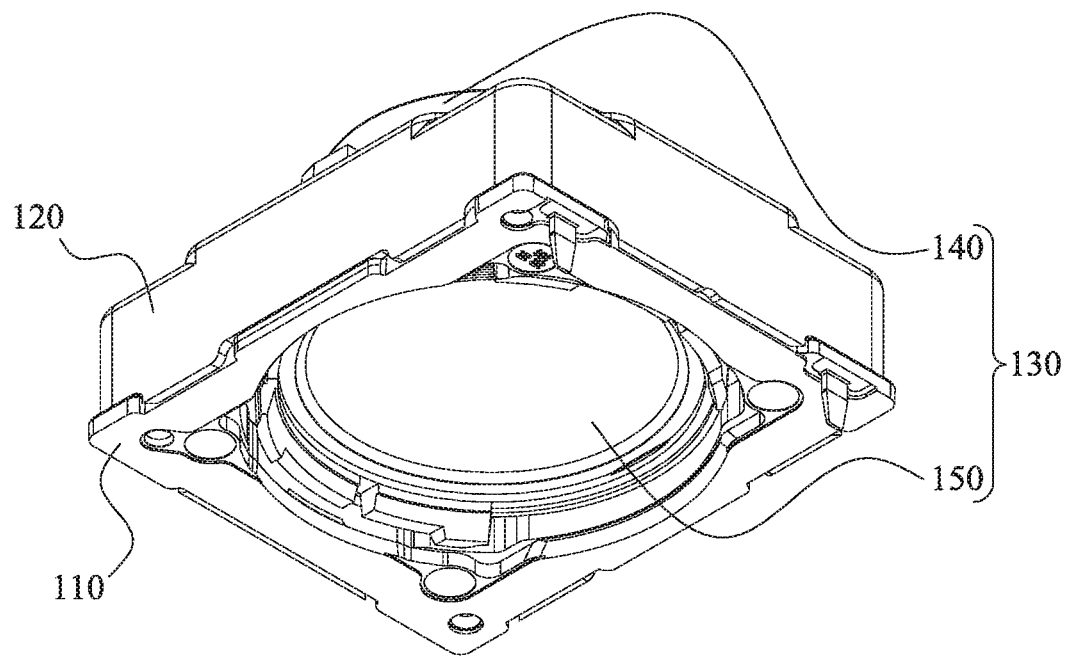
FIG. 1B is another three-dimensional view of the lens assembly driving module in FIG. 1A.
Figure 1C:
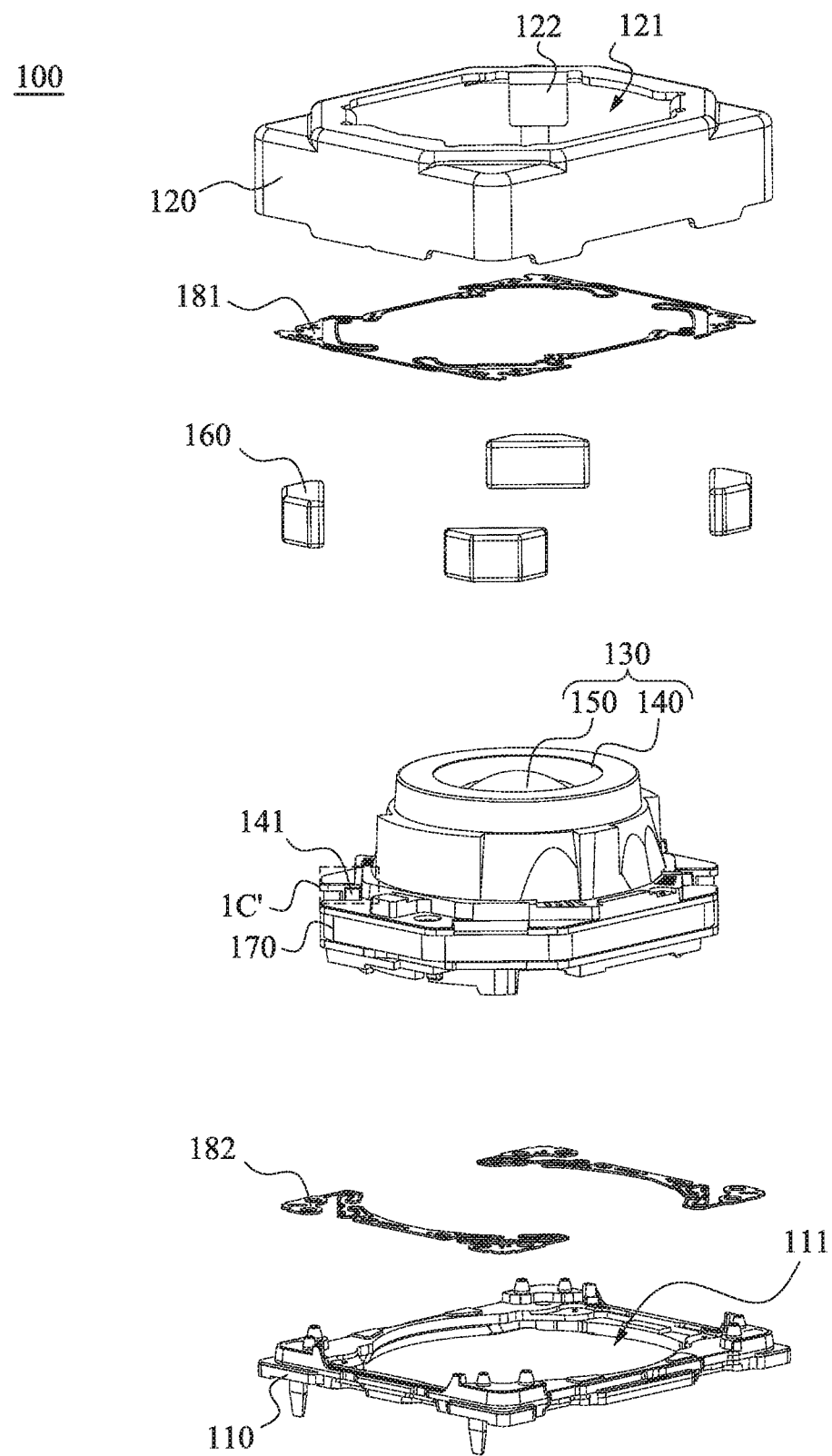
FIG. 1C is an exploded view of the lens assembly driving module in FIG. 1A.
Figure 1D:
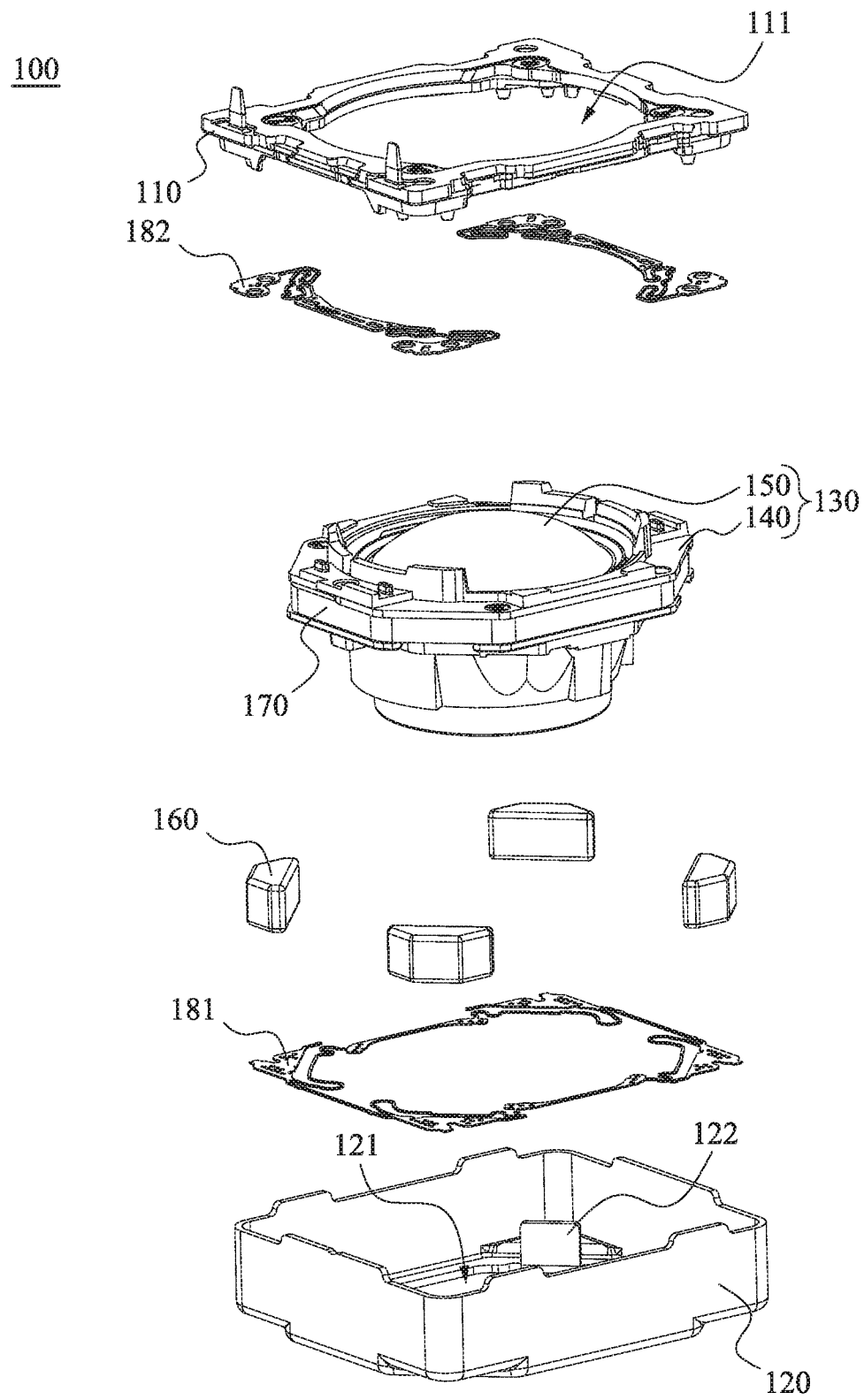
FIG. 1D is another exploded view of the lens assembly driving module in FIG. 1A.
Figure 1E:
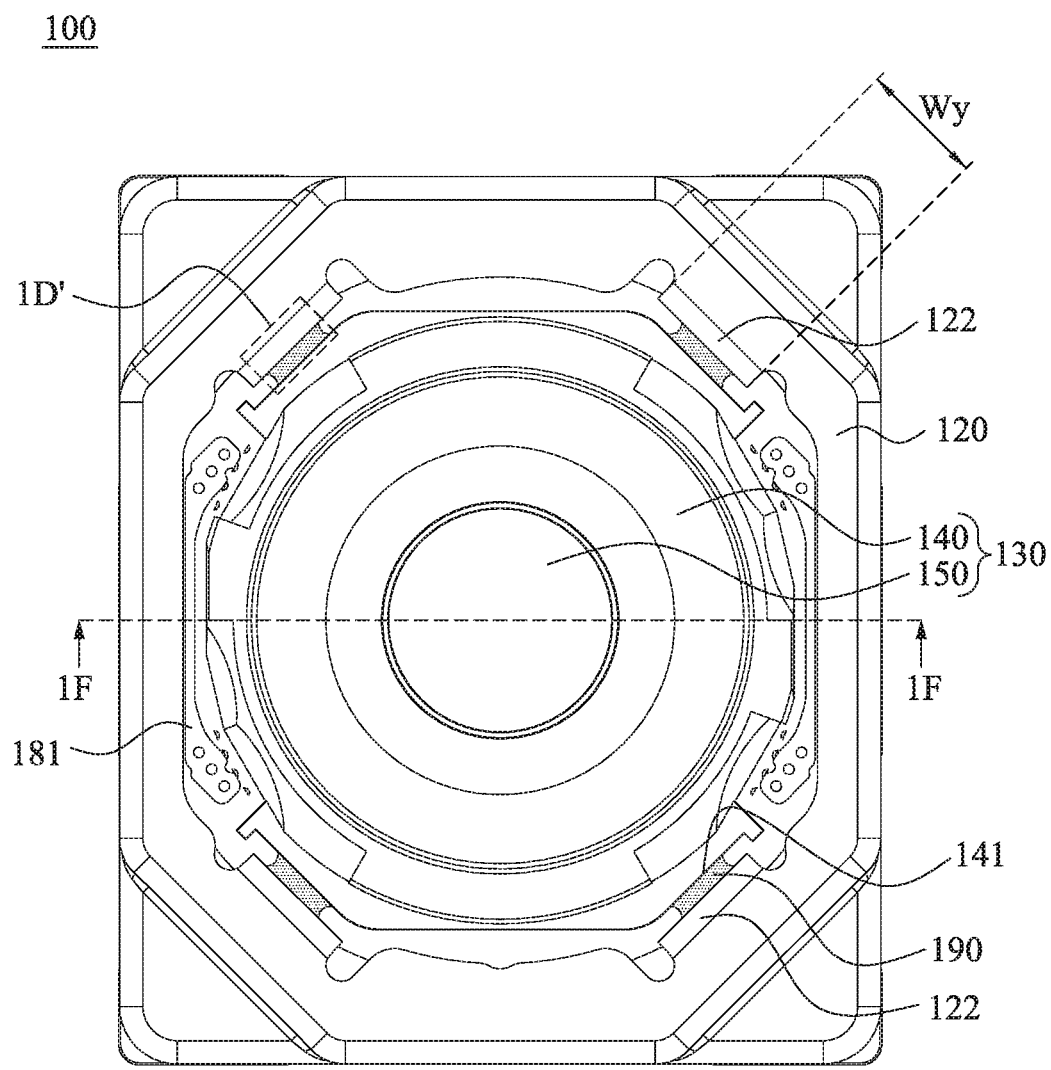
FIG. 1E is a top view of the lens assembly driving module in FIG. 1A.
Figure 1F:
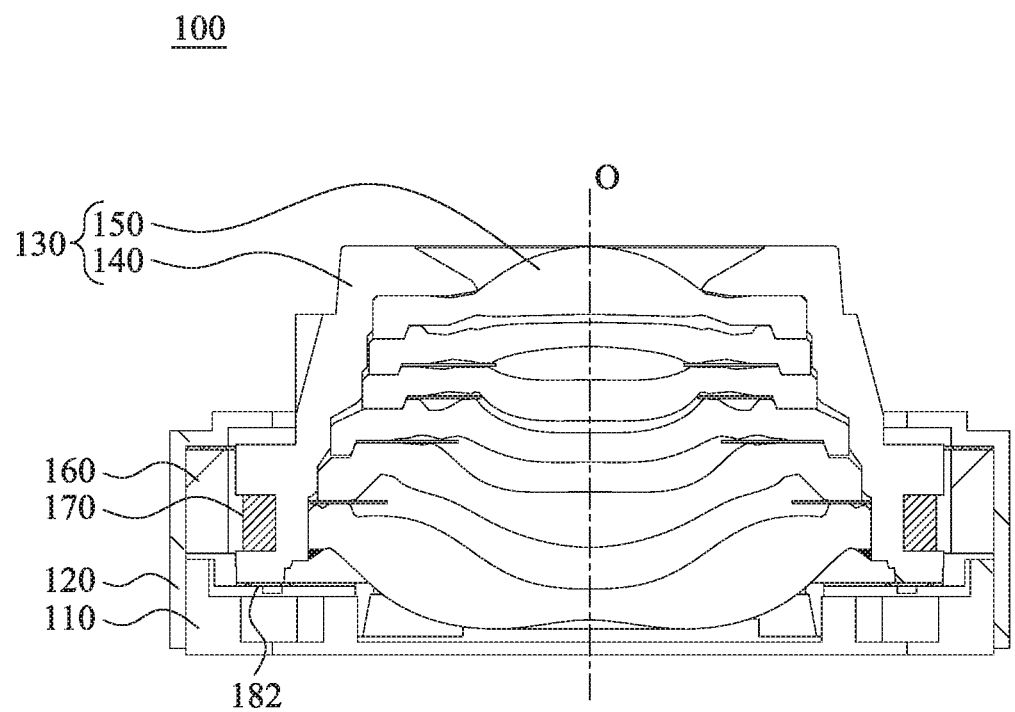
FIG. 1F is a cross-sectional view taken along line 1F-1F of the lens assembly driving module in FIG. 1E.

Please refer to FIG. 1A to FIG. 1F. FIG. 1A is a three-dimensional view of a lens assembly driving module 100 according to the 1st embodiment of the present disclosure. FIG. 1B is another three-dimensional view of the lens assembly driving module 100 in FIG. 1A. FIG. 1C is an exploded view of the lens assembly driving module 100 in FIG. 1A. FIG. 1D is another exploded view of the lens assembly driving module 100 in FIG. 1A. FIG. 1E is a top view of the lens assembly driving module 100 in FIG. 1A. FIG. 1F is a cross-sectional view taken along line 1F-1F of the lens assembly driving module 100 in FIG. 1E. As shown in FIG. 1A to FIG. 1F, the lens assembly driving module 100 includes a holder 110, a metal yoke 120, a lens unit 130, a magnet set 160, a coil 170, at least one elastic element (its reference numeral is omitted) and at least one damper agent 190. Specifically, the metal yoke 120 is coupled with the holder 110 so as to form an accommodating space (its reference numeral is omitted). The accommodating space is configured to dispose the lens unit 130, the magnet set 160, the coil 170, the elastic element and the damper agent 190.

In FIG. 1C, the holder 110 has an opening 111. The metal yoke 120 includes a through hole 121 and at least one extending structure 122. The through hole 121 of the metal yoke 120 is corresponding to the opening 111 of the holder 110. The extending structure 122 is disposed around the through hole 121, and the extending structure 122 extends along a direction from the through hole 121 to the holder 110.

Figure 1G:
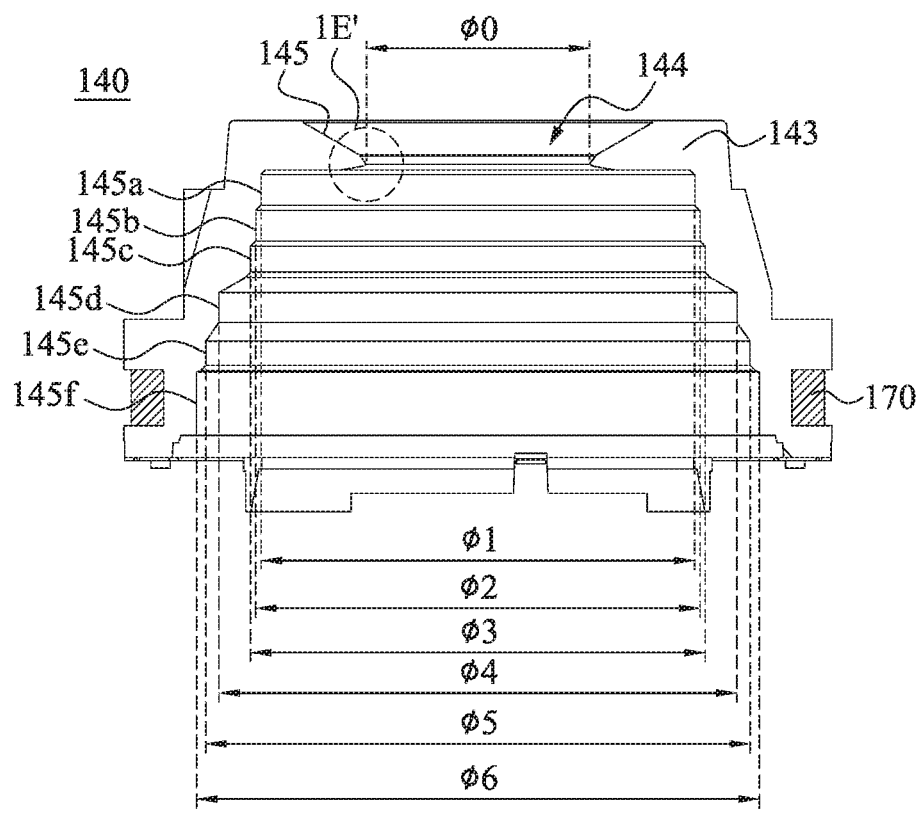
FIG. 1G is a cross-sectional view of a carrier and a coil in FIG. 1F in a combination state.
Figure 1H:
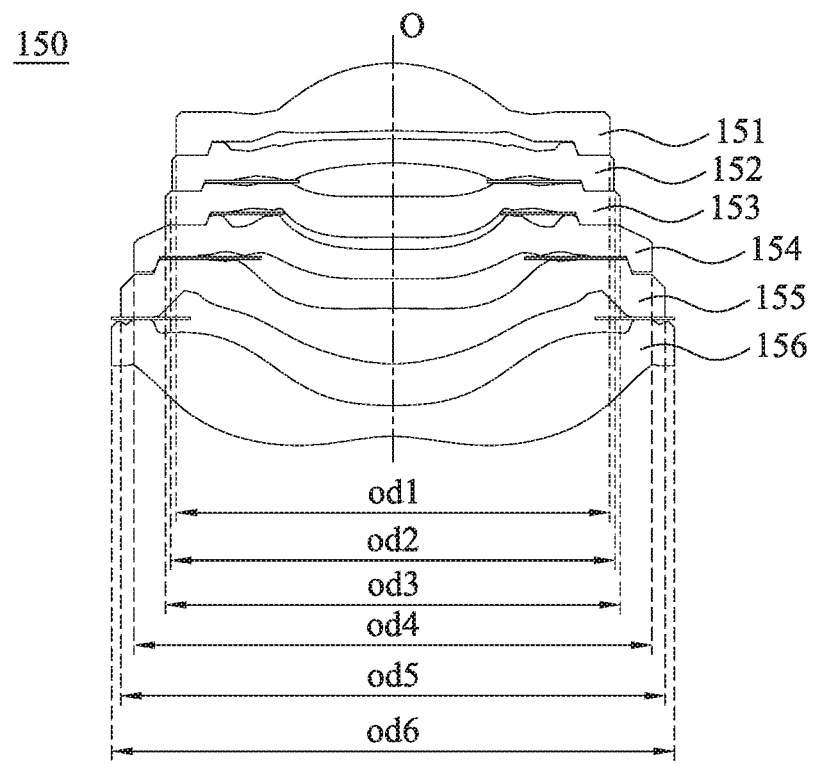
FIG. 1H is a cross-sectional view of a lens assembly in FIG. 1F.
Figure 1I:
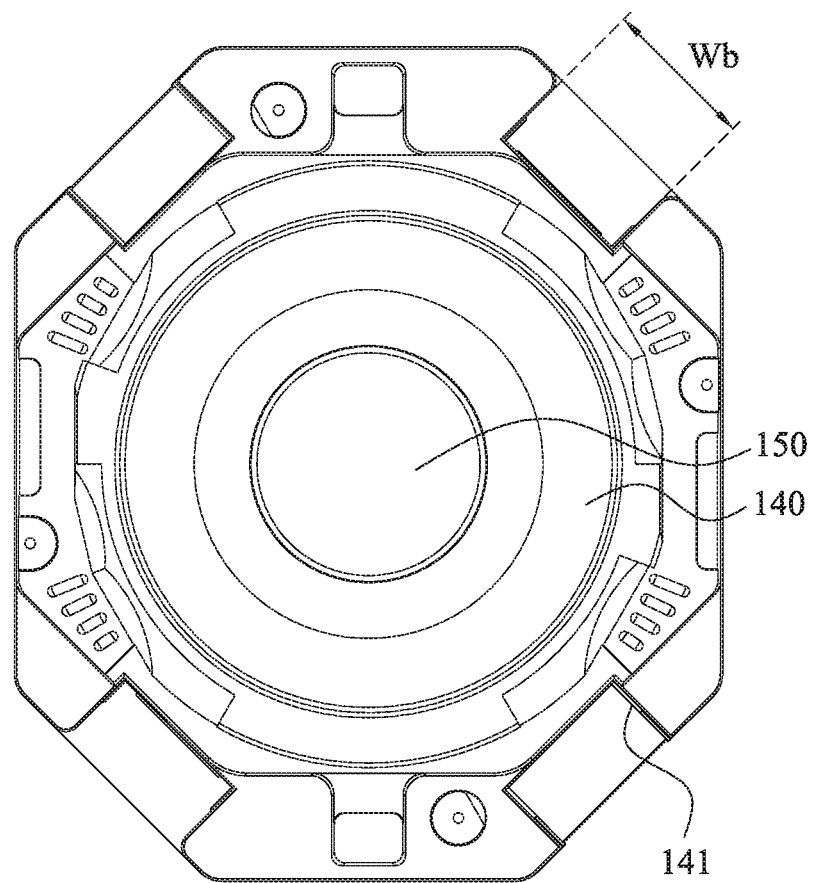
FIG. 1I is a top view of a lens unit in FIG. 1C.
Figure 1J:
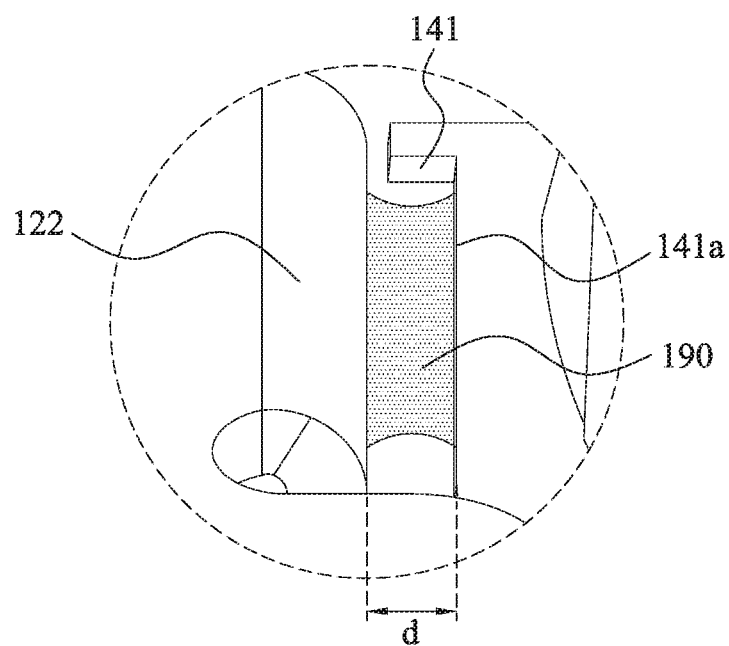
FIG. 1J is an enlarged view of a portion 1A' shown in FIG. 1A.
Figure 1K:
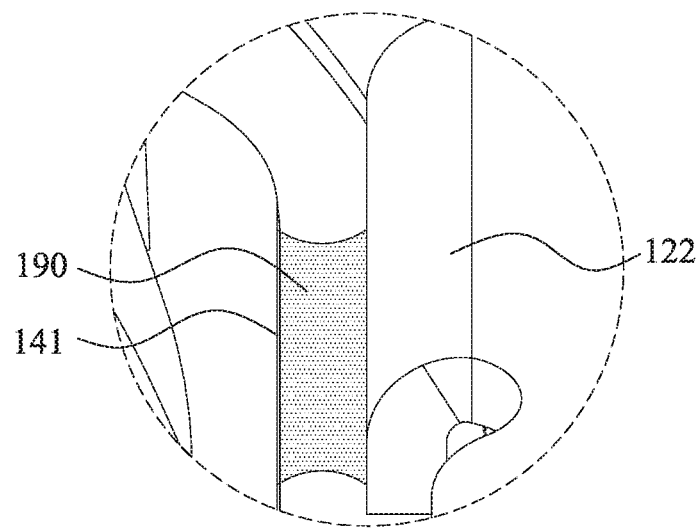
FIG. 1K is an enlarged view of a portion 1B' shown in FIG. 1A.
Figure 1L:
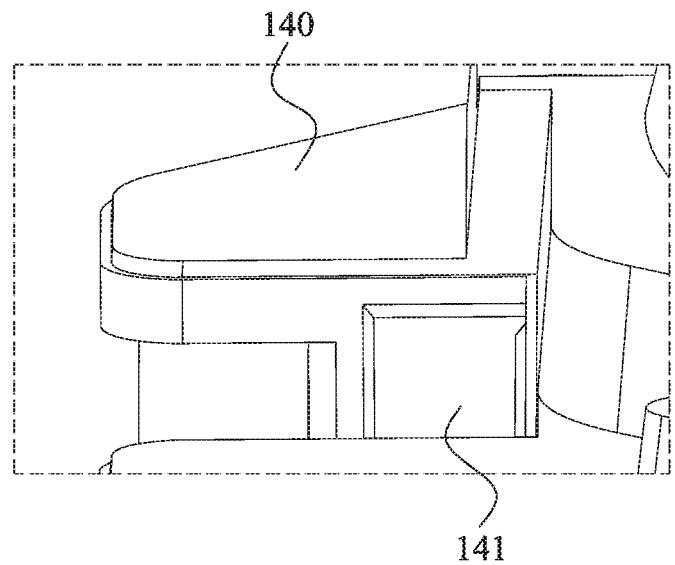
FIG. 1L is an enlarged view of a portion 1C' shown in FIG. 1C.

Please refer to FIG. 1C, FIG. 1F and FIG. 1L. FIG. 1L is an enlarged view of a portion 1C' shown in FIG. 1C. The lens unit 130 is movably disposed in the metal yoke 120. The lens unit 130 includes an optical axis O (shown in FIG. 1F) and at least one notch structure 141. The optical axis O is corresponding to the through hole 121. The notch structure 141 is disposed in an outer peripheral area (its reference numeral is omitted) of the lens unit 130, and the notch structure 141 is corresponding to the extending structure 122.

In FIG. 1C and FIG. 1F, the magnet set 160 is disposed in the metal yoke 120. The coil 170 is disposed at an exterior of the lens unit 130, and the coil 170 is corresponding to the magnet set 160.

In FIG. 1C, the elastic element is coupled with the lens unit 130 and the holder 110, respectively. Specifically, the elastic element includes a first elastic member 181 and a second elastic member 182, wherein the first elastic member 181 is coupled with the lens unit 130, and the second elastic member 182 is coupled with the lens unit 130 and the holder 110, respectively. However, the present disclosure is not limited thereto. The elastic element is for providing the degree of freedom and the restoring force required by the movement of the lens unit 130. Accordingly, elastic elements which can provide the aforementioned function can be employed in the present disclosure.

Figure 1M:
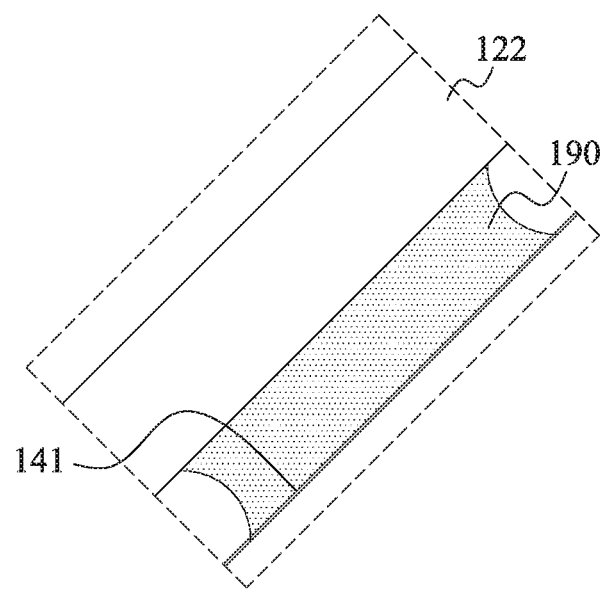
FIG. 1M is an enlarged view of a portion 1D' shown in FIG. 1E.

Please refer to FIG. 1A, FIG. 1E, FIG. 1J, FIG. 1K and FIG. 1M. FIG. 1J is an enlarged view of a portion 1A' shown in FIG. 1A. FIG. 1K is an enlarged view of a portion 1B' shown in FIG. 1A. FIG. 1M is an enlarged view of a portion 1D' shown in FIG. 1E. The damper agent 190 is disposed between the extending structure 122 of the metal yoke 120 and the notch structure 141 of the lens unit 130, wherein the damper agent 190 is applied to damp a movement of the lens unit 130.

The optical axis O is corresponding to the through hole 121, which refers that the optical axis O and the through hole 121 are corresponding to each other in function. Specifically, the correspondence in function between the optical axis O and the through hole 121 allows a portion of the lens unit 130 to pass through the through hole 121, so that light is not shielded and can enter into the lens unit 130. For example, the optical axis O can pass through the through hole 121, or the through hole 121 and the optical axis O can be coaxial.

The coil 170 is corresponding to the magnet set 160, which refers that the coil 170 and the magnet set 160 are corresponding to each other in function. Specifically, the correspondence in function between the coil 170 and the magnet set 160 allows an electromagnetic force generated therebetween. In this embodiment, a surface (its reference numeral is omitted) of the coil 170 faces toward to the magnet set 160, which can enhance the electromagnetic force therebetween.

Specifically, in a focusing process, an electronic signal is firstly obtained by the lens assembly driving module 100 according to light of an imaged object entering into the lens unit 130. The electronic signal is then sent to an electronic driver (not shown), and the electronic driver provides a current to the coil 170. With an electromagnetic force generated by the interaction of the magnet set 160 and the coil 170, the lens unit 130 is driven to move along the optical axis O, so that the autofocus functionality of the lens unit 130 can be achieved. In the above focusing process, when the lens unit 130 is driven to move, a degree of freedom of the lens unit 130 along the optical axis O can be provided by the first elastic member 181 and the second elastic member 182. The first elastic member 181 and the second elastic member 182 are deformed along the movement of the lens unit 130, and provide a restoring force to the lens unit 130 when the lens unit 130 moves back to an initial position thereof.

With the aforementioned structure, the arrangement of the extending structure 122 and the notch structure 141 is favorable for obtaining an expected control for the coating amount and the coating efficiency of the damper agent 190. Moreover, the damper agent 190 is disposed closely to the through hole 121, so that the production difficulty can be significantly reduced. Furthermore, the damper agent 190 can be coated by a multi-point coating process which is a faster coating method, and an equally damping effect for damping a movement of the lens unit 130 can be obtained.

Details of the lens assembly driving module 100 according to the 1st embodiment are provided hereinafter.

As shown in FIG. 1C, the extending structure 122 can be formed in a flat shape. Therefore, it is favorable for the damper precursor coated on the extending structure 122 to have an even thickness, so that the efficiency of irradiation curing can be enhanced.

As shown in FIG. 1C and FIG. 1F, the lens unit 130 can include a carrier 140 and a lens assembly 150. The carrier 140 is movably disposed in the metal yoke 120, and the notch structure 141 is disposed in an outer peripheral area (its reference numeral is omitted) of the carrier 140. The optical axis O is defined by the lens assembly 150. The optical axis O is corresponding to an object-side central hole 144 (shown in FIG. 1G), and the lens assembly 150 is coupled in the carrier 140. A movement of the lens assembly 150 relative to the holder 110 is according to a movement of the carrier 140. That is, in the 1st embodiment of the present disclosure, the lens assembly 150 is driven by the carrier 140 so as to move relative to the holder 110. The optical axis O is corresponding to the object-side central hole 144, which refers that the optical axis O and the object-side central hole 144 are corresponding to each other in function. Specifically, the correspondence in function between the optical axis O and the object-side central hole 144 allows light to enter into the lens assembly 150 through the object-side central hole 144. For example, the optical axis O can pass through the object-side central hole 144, or the object-side central hole 144 and the optical axis O can be coaxial.

FIG. 1G is a cross-sectional view of the carrier 140 and the coil 170 in FIG. 1F in a combination state. In FIG. 1G, the carrier 140 can include an object-side portion 143 and at least three inner surfaces (145a-145f). The object-side portion 143 has the object-side central hole 144. Each of the inner surfaces (145a-145f) has a diameter ($\phi1\sim\phi6$). The diameters of the inner surfaces are different from each other, and each of the diameters of the inner surfaces is greater than a diameter $\phi0$ of the object-side central hole 144. According to the 1st embodiment, the carrier 140 includes six inner surfaces, which are an inner surface 145a, an inner surface 145b, an inner surface 145c, an inner surface 145d, an inner surface 145e and an inner surface 145f, respectively. A diameter of the inner surface 145a is $\phi1$. A diameter of the inner surface 145b is $\phi2$. A diameter of the inner surface 145c is $\phi3$. A diameter of the inner surface 145d is $\phi4$. A diameter of the inner surface 145e is $\phi5$. A diameter of the inner surface 145f is $\phi6$. The diameter of the object-side central hole 144 is $\phi0$. The diameters $\phi1-\phi6$ of the six inner surfaces 145a-145f are different from each other and are all greater than the diameter $\phi0$ of the object-side central hole 144. Moreover, as shown in FIG. 1F and FIG. 1G, the object-side central hole 144 and the inner surfaces 145a-145f of the carrier 140 are configured to form a barrel structure (its reference numeral is omitted), and an internal space (its reference numeral is omitted) is defined by the inner surfaces 145a-145f for directly accommodating the lens assembly 150. Therefore, the volume of the carrier 140 can be reduced, the number of components and assembling steps can be reduced, and the production efficiency can be enhanced. Furthermore, the number of the inner surfaces (145a-145f) in the 1st embodiment is only exemplary, and the present disclosure is not limited thereto. In other embodiments, the number of the inner surfaces can be adjusted according to the number of the lens elements of the lens assembly.

Figure 1N:
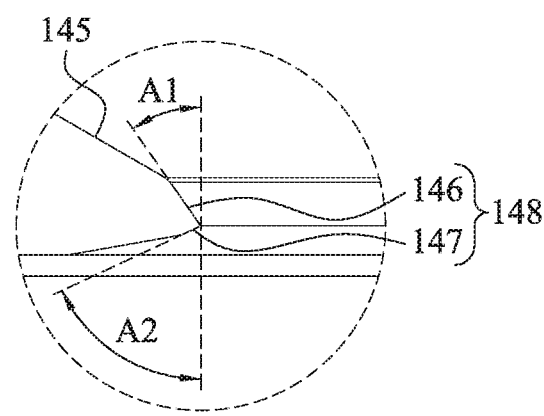
FIG. 1N is an enlarged view of a portion 1E' shown in FIG. 1G.

Please refer to FIG. 1G and FIG. 1N. FIG. 1N is an enlarged view of a portion 1E' shown in FIG. 1G. The object-side portion 143 of the carrier 140 can include an annular side wall 145. The annular side wall 145 surrounds the object-side central hole 144. The annular side wall 145 includes a tip end structure 148 formed by an inclined plane 146 and an inclined plane 147. An included angle between the inclined plane 146 and the optical axis O is A1, and A1 is greater than 0 degrees and less than 90 degrees. An included angle between the inclined plane 147 and the optical axis O is A2, and A2 is greater than 0 degrees and less than 90 degrees. Therefore, the image quality of the lens assembly 150 disposed in the carrier 140 can be enhanced, so that the stability of the molding quality of the carrier 140 can be enhanced. Accordingly, phenomena, such as flash, sink and short shot, can be prevented.

In FIG. 1F and FIG. 1G, a portion of the carrier 140 surrounded by the coil 170 can be disposed inside the metal yoke 120, and the object-side portion 143 of the carrier 140 is exposed to an outside (its reference numeral is omitted) of the metal yoke 120. Therefore, the extending structure 122 of the metal yoke 120 can be closer to the notch structure 141 of the carrier 140. As a result, the notch structure 141 shielded by the metal yoke 120, which will affect the efficiency of irradiation curing of the damper precursor, can be prevented.

FIG. 1H is a cross-sectional view of the lens assembly 150 in FIG. 1F. In FIG. 1H, the lens assembly 150 can include at least three lens elements (151-156), and each of the lens elements (151-156) has an outer diameter (od1-od6). The outer diameters of the at least three lens elements can be different from each other. According to the 1st embodiment, the number of the lens elements of the lens assembly 150 is six, in order from an object side (its reference numeral is omitted) to an image side (its reference numeral is omitted), the six lens elements are a lens element 151, a lens element 152, a lens element 153, a lens element 154, a lens element 155 and a lens element 156. An outer diameter of the lens element 151 is od1. An outer diameter of the lens element 152 is od2. An outer diameter of the lens element 153 is od3. An outer diameter of the lens element 154 is od4. An outer diameter of the lens element 155 is od5. An outer diameter of the lens element 156 is od6. Specifically, the outer diameters od1-od6 of the lens elements 151-156 can be corresponding to the diameters $\phi1-\phi6$ of the inner surfaces

145a-145f, which is favorable for directly accommodating the lens assembly 150 in the carrier 140. Moreover, the number and the structure of the lens elements (151-156) in the 1st embodiment are only exemplary, and the present disclosure is not limited thereto. In other embodiments, the number and the structure of the lens elements of the lens assembly can be adjusted according to the desired optical functionalities.

FIG. 1I is a top view of the lens unit 130 in FIG. 1C. As shown in FIG. 1E and FIG. 1I, in the assembled lens assembly driving module 100, the extending structure 122 of the metal yoke 120 is located in the notch structure 141. Therefore, the extending structure 122 can be kept a certain distance with the notch structure 141. The certain distance is favorable for coating the damper precursor between the extending structure 122 and the notch structure 141 without disconnection.

In FIG. 1J, when a distance between a bottom 141a of the notch structure 141 and the extending structure 122 perpendicular to the optical axis O is d, the following condition can be satisfied: 0.002 mm<d<0.6 mm. Therefore, the distance between the bottom 141a of the notch structure 141 and the extending structure 122 perpendicular to the optical axis O is proper, which is favorable for controlling the coating range of the liquid damper precursor, and overflow or insufficient dose of the liquid damper precursor can be prevented. Accordingly, the use amount of the damper precursor can be reduced.

In FIG. 1E, when a number of the notch structure 141 is Nn, and a number of the extending structure 122 is Ne, the following conditions can be satisfied: 2≤Nn≤6; and Nn=Ne. Therefore, the number of the notch structure 141 and the extending structure 122 are proper. When the number is excessively large, the manufacturing efficiency of the metal yoke 120 is reduced. When the number is excessively small, the distribution of the positions disposed with the damper agent 190 is uneven, which tends to cause the tilt of the carrier 140.

In FIG. 1E and FIG. 1I, when a width of the extending structure 122 is Wy, and a width of the notch structure 141 is Wb, the following condition can be satisfied: 0.4<Wy/Wb<1.0. Therefore, an excessive change of the width of the air space between the extending structure 122 and the notch structure 141 can be prevented, which is favorable for maintaining an even air space.

In FIG. 1C, the magnet set 160 includes four magnets (reference numerals thereof are omitted). However, the present disclosure is not limited thereto. The magnet set 160 is for interacting with the coil 170 so as to generate the electromagnetic force. Therefore, the number and the arrangement of the magnets of the magnet set 160 can be adjusted according to practical demands.

In FIG. 1C, the elastic element includes the first elastic member 181 and the second elastic member 182. The first elastic member 181 is coupled with a portion of the lens unit 130 away from the holder 110, and the second elastic member 182 is coupled with a portion of the lens unit 130 close to the holder 110. Therefore, the lens unit 130 can be supported on the holder 110. Moreover, with the upper and lower assembly of the first elastic member 181 and the second elastic member 182, the tilt of the lens unit 130 can be prevented. In the 1st embodiment, the elastic element has a total of two elastic members (i.e., the first elastic member 181 and the second elastic member 182). However, the present disclosure is not limited thereto. The elastic element is for providing the degree of freedom and the restoring force required by the movement of the lens unit 130. Accordingly, elastic elements which can provide the aforementioned function can be employed in the present disclosure. In other words, the number and the structure of the elastic members of the elastic element can be adjusted according to practical demands.

In FIG. 1C, the second elastic member 182 can include two springs (reference numerals thereof are omitted). The two springs are separated with each other, and the two springs are arranged on a same horizontal plane. Specifically, the two springs are electrically separated with each other. Therefore, the two springs can be employed as transmission path of current signals for the coil 170 (i.e., can be employed to send current signals required by the coil 170).

In FIG. 1E, the notch structure 141 and the damper agent 190 are corresponding to the through hole 121 and are not shielded by the metal yoke 120 along a direction parallel to the optical axis O. Therefore, it is favorable for finding the injection position of the damper precursor from the outside of the metal yoke 120. Moreover, it can prevent to shield the light source of irradiation curing, which can enhance the process efficiency.

In FIG. 1E, the damper agent 190 is formed by the damper precursor cured via a UV irradiation from the through hole 121. With directly receiving the UV irradiation from the through hole 121, the difficulty of irradiation curing can be reduced.

In FIG. 1E, when a number of the damper agent 190 disposed in the notch structure 141 is Na, the following conditions can be satisfied: 2≤Na≤12; and Na is an even number. Therefore, a single notch structure 141 can be disposed with a damper agent 190 or a plurality of the damper agents 190, which is favorable for reducing the use amount of the damper agent 190, reducing the cost and maintaining the effect for damping the movement of the lens unit 130.

According to the present disclosure, the damper precursor can be but is not limited to a commercial product TB3168 (provided by Three Bond International, Inc.). The commercial product TB3168 can be cured via a UV irradiation.

In the 1st embodiment, values of parameters d, Nn, Ne, Na, Wy, Wb, Wy/Wb are listed in Table 1.

TABLE 1

| d[mm] | 0.13 | Wy [mm] | 1.19 |
|---|---|---|---|
| Nn | 4 | Wb [mm] | 1.46 |
| Ne | 4 | Wy/Wb | 0.82 |
| Na | 4 | | |

2nd Embodiment

Figure 2A:
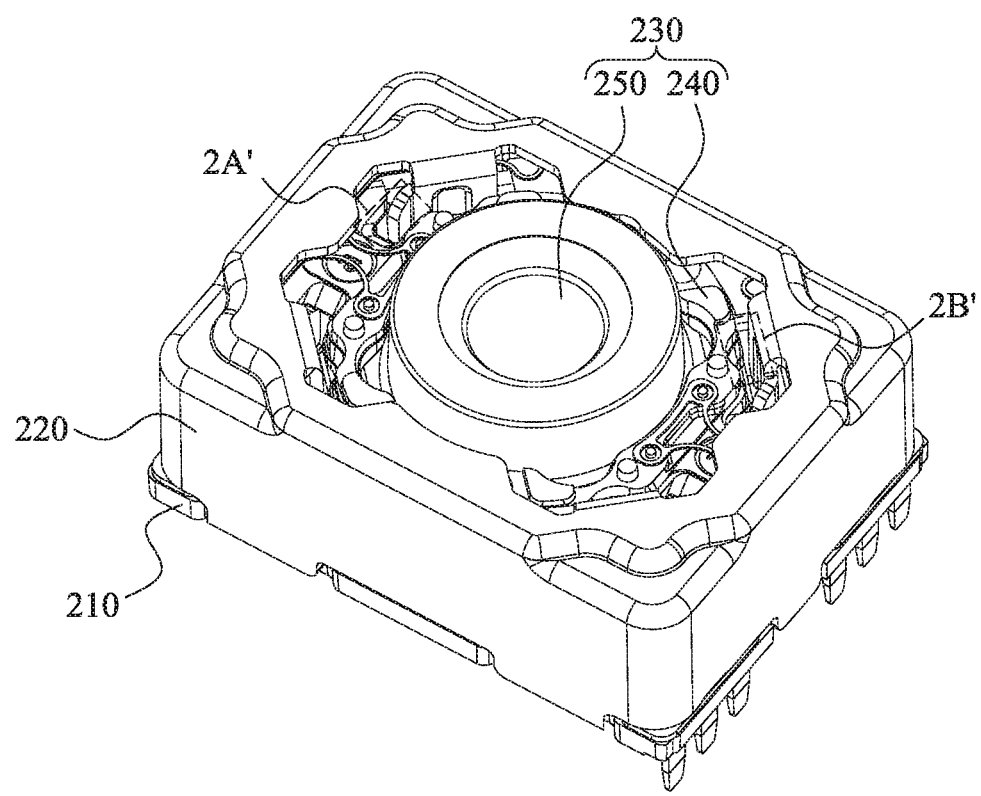
FIG. 2A is a three-dimensional view of a lens assembly driving module according to the 2nd embodiment of the present disclosure.
Figure 2B:
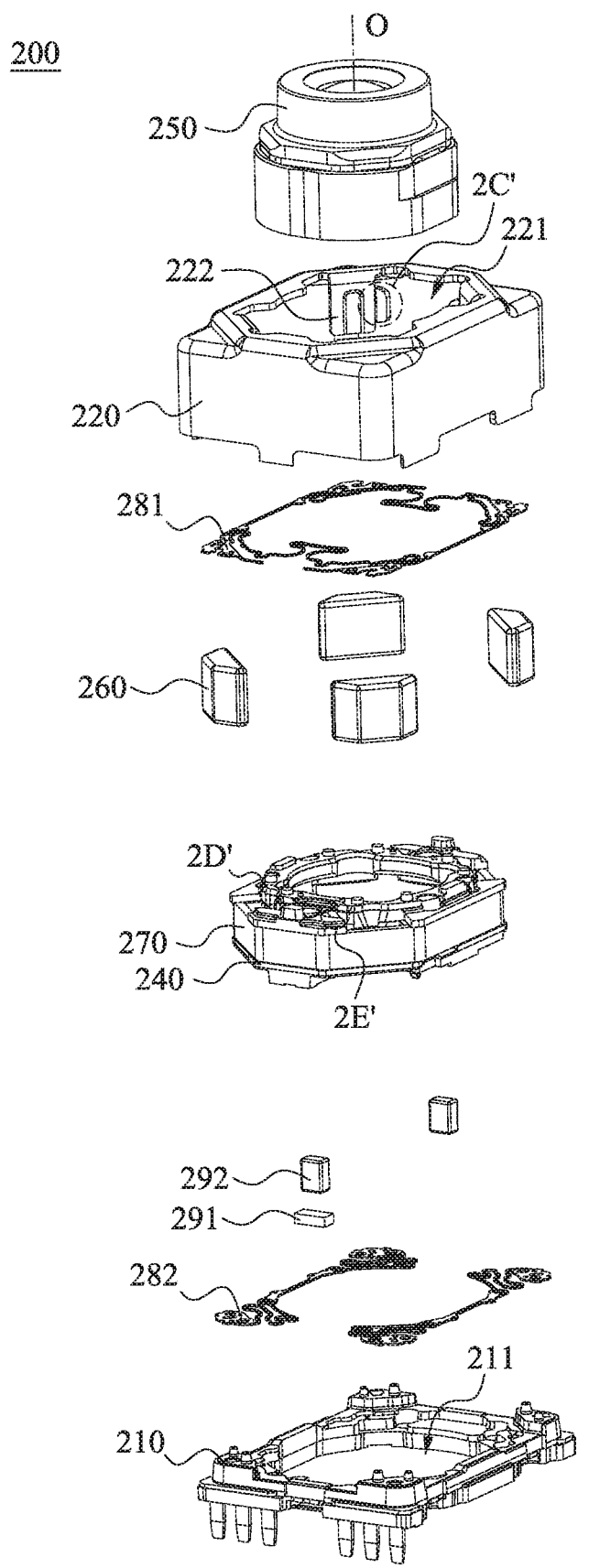
FIG. 2B is an exploded view of the lens assembly driving module in FIG. 2A.
Figure 2C:
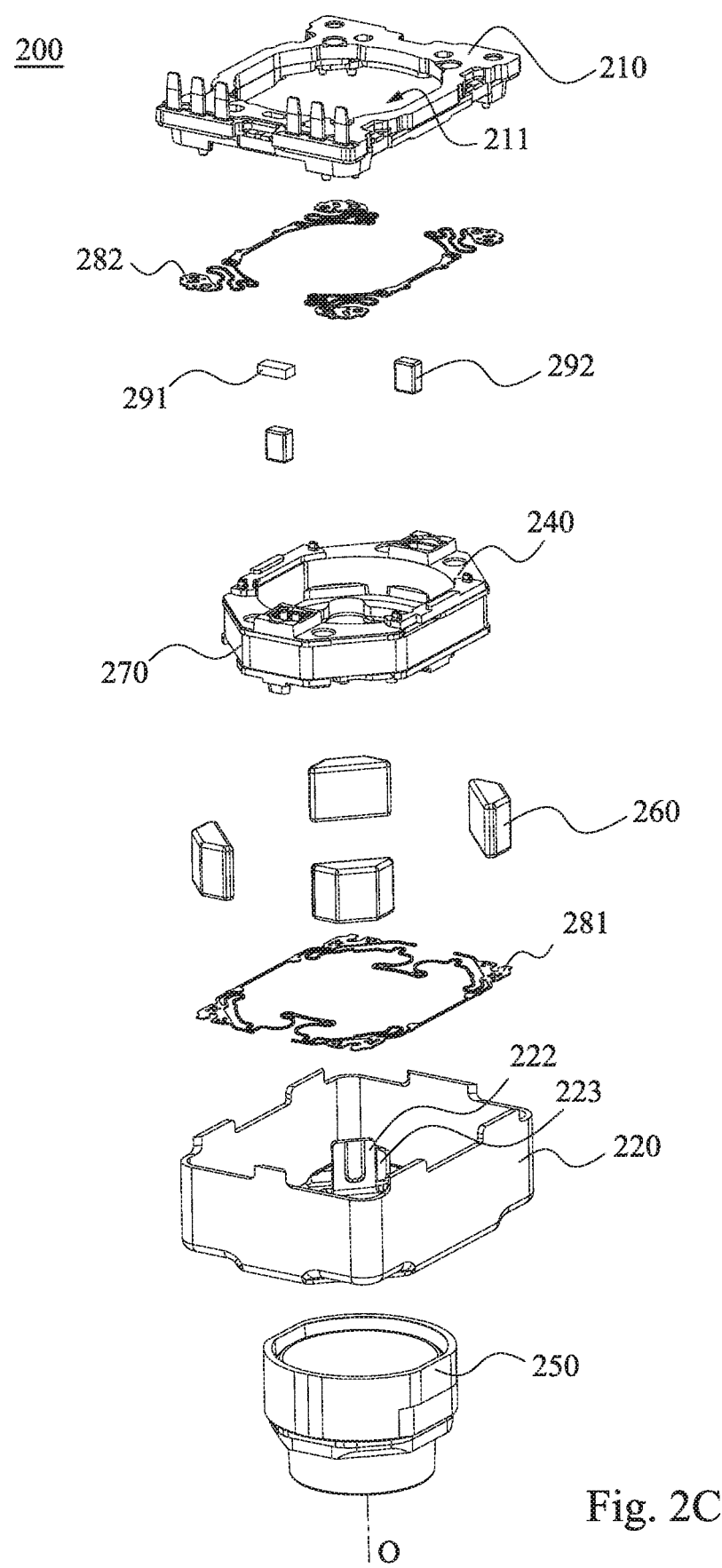
FIG. 2C is another exploded view of the lens assembly driving module in FIG. 2A.
Figure 2D:
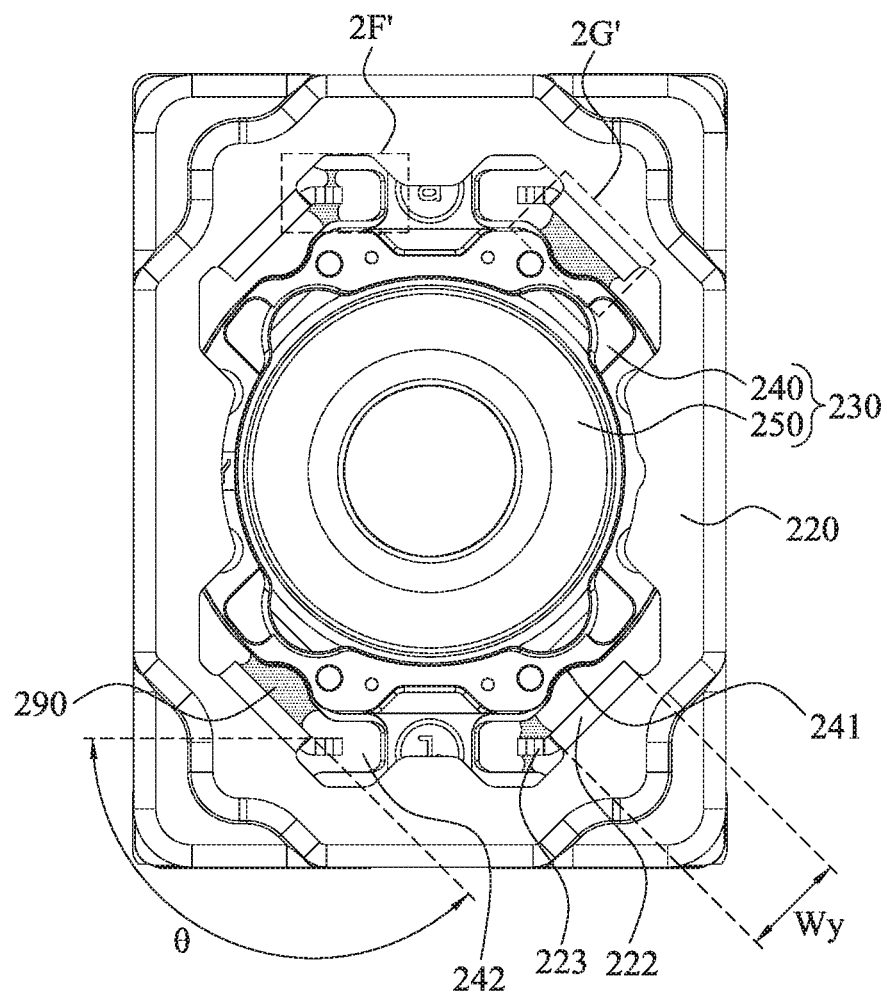
FIG. 2D is a top view of the lens assembly driving module in FIG. 2A.

Please refer to FIG. 2A to FIG. 2D. FIG. 2A is a three-dimensional view of a lens assembly driving module 200 according to the 2nd embodiment of the present disclosure. FIG. 2B is an exploded view of the lens assembly driving module 200 in FIG. 2A. FIG. 2C is another exploded view of the lens assembly driving module 200 in FIG. 2A. FIG. 2D is a top view of the lens assembly driving module 200 in FIG. 2A. As shown in FIG. 2A to FIG. 2D, the lens assembly driving module 200 includes a holder 210, a metal yoke 220, a lens unit 230, a magnet set 260, a coil 270, at least one elastic element (its reference numeral is omitted) and at least one damper agent 290. Specifically, the metal yoke 220 is coupled with the holder 210 so as to form an accommodating space (its reference numeral is omitted).

The accommodating space is configured to dispose the lens unit 230, the magnet set 260, the coil 270, the elastic element and the damper agent 290.

The holder 210 has an opening 211. The metal yoke 220 includes a through hole 221 and at least one extending structure 222. The through hole 221 of the metal yoke 220 is corresponding to the opening 211 of the holder 210. The extending structure 222 is disposed around the through hole 221, and the extending structure 222 extends along a direction from the through hole 221 to the holder 210.

The lens unit 230 is movably disposed in the metal yoke 220. The lens unit 230 includes an optical axis O (shown in FIG. 2B) and at least one notch structure 241. The optical axis O is corresponding to the through hole 221. The notch structure 241 is disposed in an outer peripheral area (its reference numeral is omitted) of the lens unit 230, and the notch structure 241 is corresponding to the extending structure 222. Please refer to FIG. 2I and FIG. 2K. FIG. 2I is an enlarged view of a portion 2B' shown in FIG. 2A. FIG. 2K is an enlarged view of a portion 2D' shown in FIG. 2B. The correspondence between the notch structure 241 and the extending structure 222 is shown in FIG. 2I. The notch structure 241 is shown in FIG. 2K.

The magnet set 260 is disposed in the metal yoke 220. The coil 270 is disposed at an exterior of the lens unit 230, and the coil 270 is corresponding to the magnet set 260.

The elastic element is coupled with the lens unit 230 and the holder 210, respectively. Specifically, in FIG. 2B and FIG. 2C, the elastic element includes a first elastic member 281 and a second elastic member 282, wherein the first elastic member 281 is coupled with the lens unit 230, and the second elastic member 282 is coupled with the lens unit 230 and the holder 210, respectively. However, the present disclosure is not limited thereto. The elastic element is for providing the degree of freedom and the restoring force required by the movement of the lens unit 230. Accordingly, elastic elements which can provide the aforementioned function can be employed in the present disclosure.

Figure 2E:
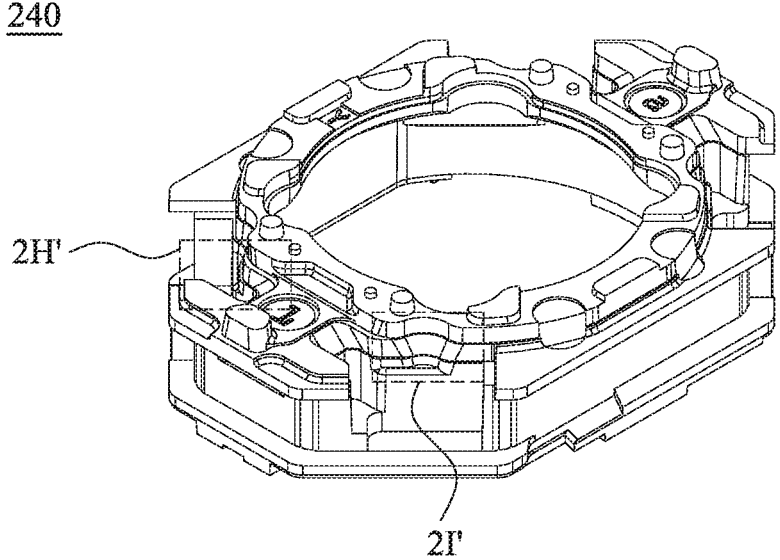
FIG. 2E is a three-dimensional view of a carrier in FIG. 2B.
Figure 2F:
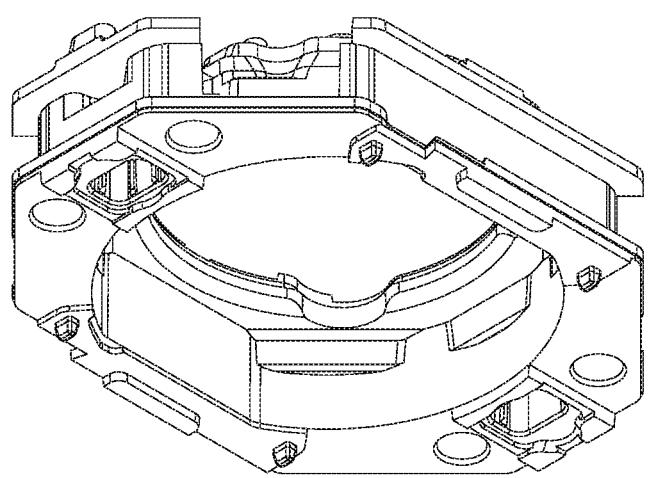
FIG. 2F is another three-dimensional view of the carrier in FIG. 2B.
Figure 2G:
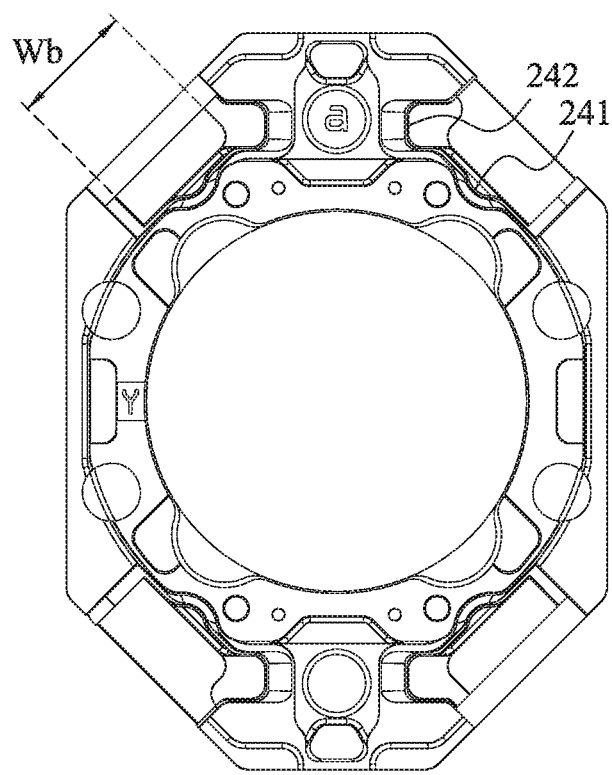
FIG. 2G is a top view of the carrier in FIG. 2B.
Figure 2H:
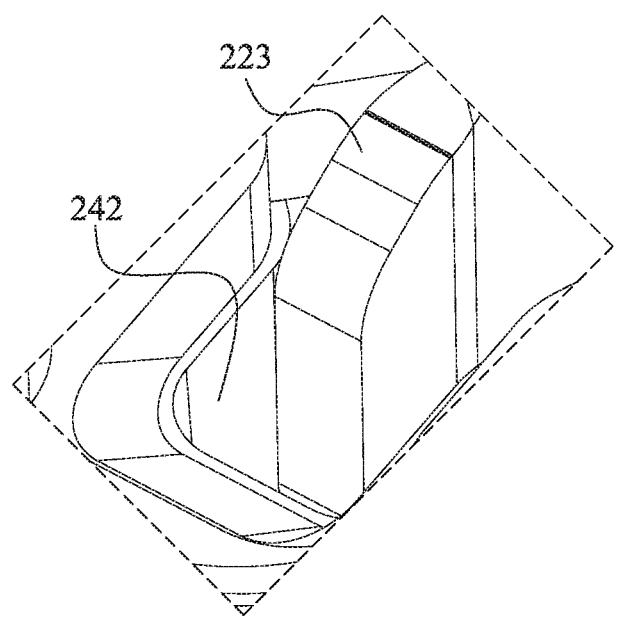
FIG. 2H is an enlarged view of a portion 2A' shown in FIG. 2A.
Figure 2I:
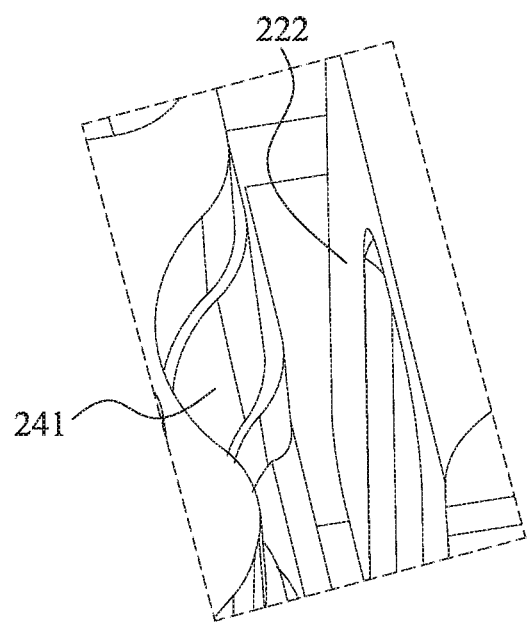
FIG. 2I is an enlarged view of a portion 2B' shown in FIG. 2A.
Figures 2J, 2K:
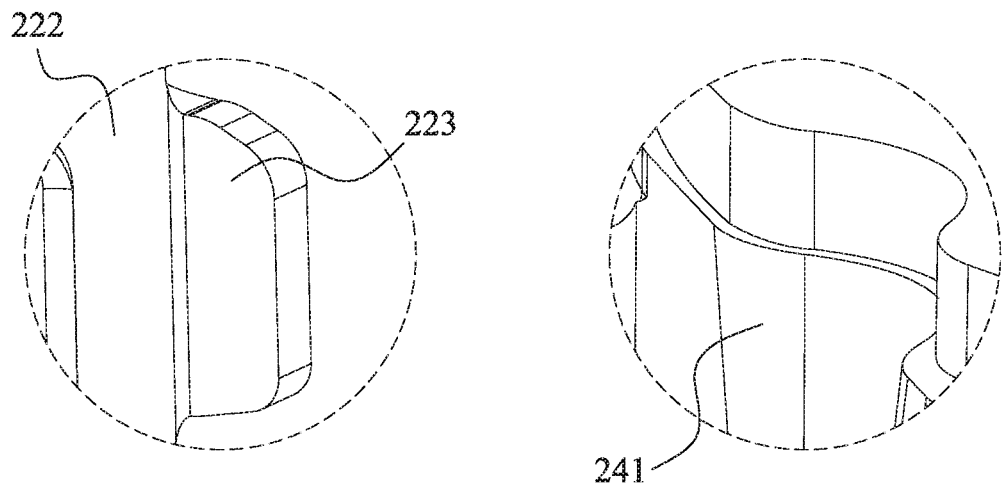
FIG. 2J is an enlarged view of a portion 2C' shown in FIG. 2B.
FIG. 2K is an enlarged view of a portion 2D' shown in FIG. 2B.
Figure 2L:
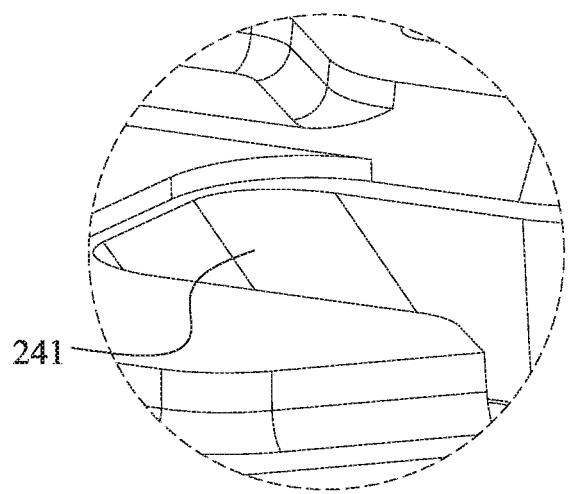
FIG. 2L is an enlarged view of a portion 2E' shown in FIG. 2B.
Figure 2M:
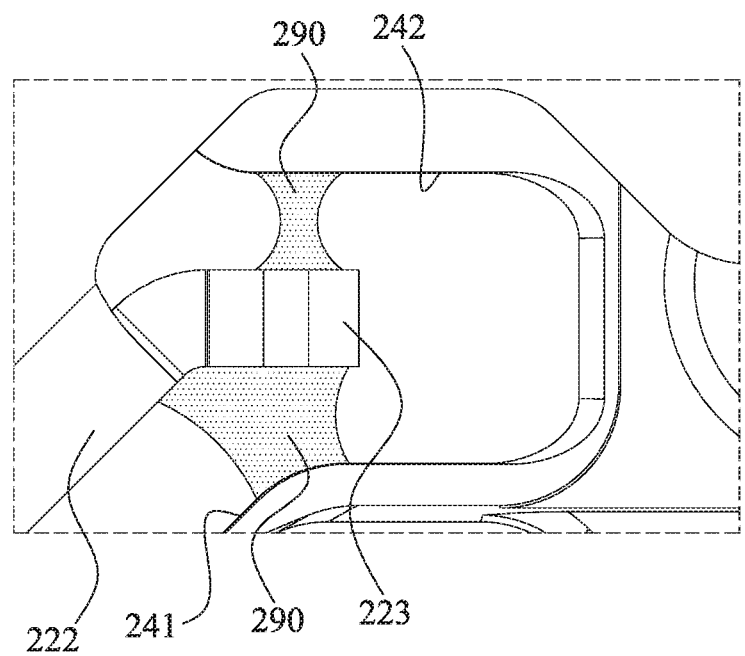
FIG. 2M is an enlarged view of a portion 2F' shown in FIG. 2D.
Figure 2N:
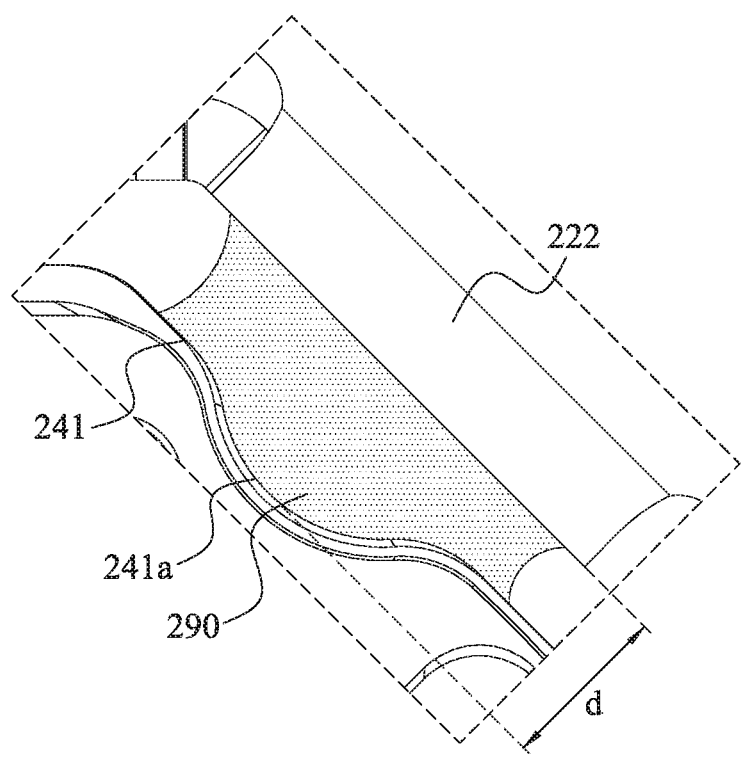
FIG. 2N is an enlarged view of a portion 2G' shown in FIG. 2D.

Please refer to FIG. 2D and FIG. 2N. FIG. 2N is an enlarged view of a portion 2G' shown in FIG. 2D. The damper agent 290 is disposed between the extending structure 222 of the metal yoke 220 and the notch structure 241 of the lens unit 230, wherein the damper agent 290 is applied to damp a movement of the lens unit 230.

The optical axis O is corresponding to the through hole 221, which refers that the optical axis O and the through hole 221 are corresponding to each other in function. Specifically, the correspondence in function between the optical axis O and the through hole 221 allows a portion of the lens unit 230 to pass through the through hole 221, so that light is not shielded and can enter into the lens unit 230. For example, the optical axis O can pass through the through hole 221, or the through hole 221 and the optical axis O can be coaxial.

The coil 270 is corresponding to the magnet set 260, which refers that the coil 270 and the magnet set 260 are corresponding to each other in function. Specifically, the correspondence in function between the coil 270 and the magnet set 260 allows an electromagnetic force generated therebetween. In this embodiment, a surface (its reference numeral is omitted) of the coil 270 faces toward to the magnet set 260, which can enhance the electromagnetic force therebetween.

Specifically, in a focusing process, an electronic signal is firstly obtained by the lens assembly driving module 200 according to light of an imaged object entering into the lens unit 230. The electronic signal is then sent to an electronic driver (not shown), and the electronic driver provides a current to the coil 270. With an electromagnetic force generated by the interaction of the magnet set 260 and the coil 270, the lens unit 230 is driven to move along the optical axis O, so that the autofocus functionality of the lens unit 230 can be achieved. In the above focusing process, when the lens unit 230 is driven to move, a degree of freedom of the lens unit 230 along the optical axis O can be provided by the first elastic member 281 and the second elastic member 282. The first elastic member 281 and the second elastic member 282 are deformed along the movement of the lens unit 230, and provide a restoring force to the lens unit 230 when the lens unit 230 moves back to an initial position thereof.

With the aforementioned structure, the arrangement of the extending structure 222 and the notch structure 241 is favorable for obtaining an expected control for the coating amount and the coating efficiency of the damper agent 290. Moreover, the damper agent 290 is disposed closely to the through hole 221, so that the production difficulty can be significantly reduced. Furthermore, the damper agent 290 can be coated by a multi-point coating process which is a faster coating method, and an equally damping effect for damping a movement of the lens unit 230 can be obtained.

Details of the lens assembly driving module 200 according to the 2nd embodiment are provided hereinafter.

In FIG. 2B and FIG. 2C, the lens unit 230 can include a carrier 240 and a lens assembly 250. The lens assembly 250 can include a barrel (its reference numeral is omitted) and at least three lens elements (only a portion of the lens element which is closest to the object side and exposes from the barrel is shown, and the reference numeral thereof is omitted). The at least three lens elements are disposed in the barrel. Each of the lens elements has an outer diameter. The outer diameters of the at least three lens elements can be different from each other. The carrier 240 is movably disposed in the metal yoke 220, and the lens assembly 250 is coupled in the carrier 240. A movement of the lens assembly 250 relative to the holder 210 is according to a movement of the carrier 240.

Figure 2O:
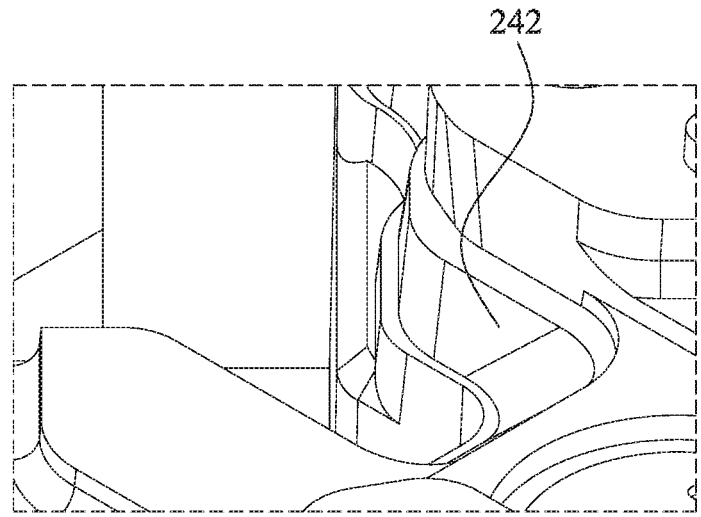
FIG. 2O is an enlarged view of a portion 2H' shown in FIG. 2E.
Figure 2P:
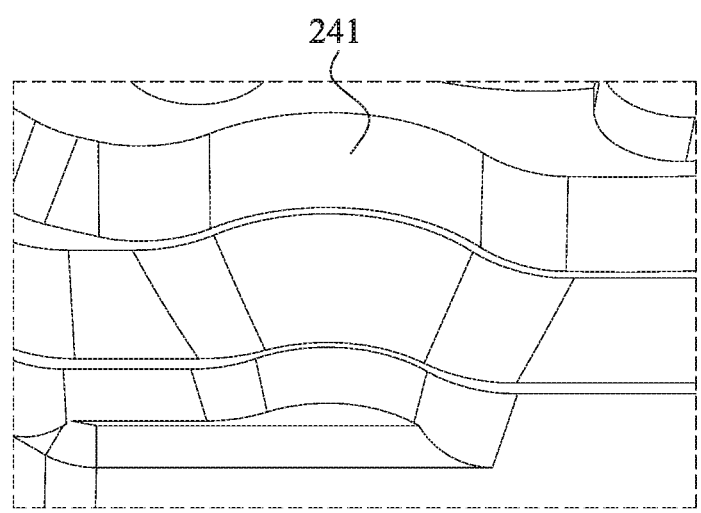
FIG. 2P is an enlarged view of a portion 2I' shown in FIG. 2E.

Please refer to FIG. 2E, FIG. 2F, FIG. 2G, FIG. 2O and FIG. 2P. FIG. 2E is a three-dimensional view of the carrier 240 in FIG. 2B. FIG. 2F is another three-dimensional view of the carrier 240 in FIG. 2B. FIG. 2G is a top view of the carrier 240 in FIG. 2B. FIG. 2O is an enlarged view of a portion 2H' shown in FIG. 2E. FIG. 2P is an enlarged view of a portion 2I' shown in FIG. 2E. As shown in FIG. 2E, FIG. 2F, FIG. 2G, FIG. 2O and FIG. 2P, the notch structure 241 is disposed in an outer peripheral area (its reference numeral is omitted) of the carrier 240, and the notch structure 241 includes a broadwise notch structure 242.

Please refer to FIG. 2D, FIG. 2H, FIG. 2J and FIG. 2M. FIG. 2H is an enlarged view of a portion 2A' shown in FIG. 2A. FIG. 2J is an enlarged view of a portion 2C' shown in FIG. 2B. FIG. 2M is an enlarged view of a portion 2F' shown in FIG. 2D. As shown in FIG. 2D, FIG. 2H, FIG. 2J and FIG. 2M, the extending structure 222 includes a broadwise extending structure 223, the notch structure 241 includes a broadwise notch structure 242, and the broadwise extending structure 223 is corresponding to the broadwise notch structure 242. The broadwise notch structure 242 is exposed to an outside via the through hole 221, so that positions for injecting the damper agent 290 can be increased, and the using amount of the damper agent 290 can be reduced.

FIG. 2L is an enlarged view of a portion 2E' shown in FIG. 2B. As shown in FIG. 2L, a portion of the broadwise notch structure 242 close to the through hole 221 of the metal yoke 220 tapers along a direction toward the holder 210. Therefore, the success rate of coating the damper agent 290 can be enhanced, the quality of injecting the damper agent 290 can be enhanced, and the overflow can be reduced.

In FIG. 2D, when an included angle between the broadwise extending structure 223 and the extending structure 222 is θ, the following condition can be satisfied: 95 degrees<θ<175 degrees. Therefore, an excessive huge volume of the broadwise notch structure 242 can be avoided, and the strength of the broadwise extending structure 223 can be maintained.

As shown in FIG. 2D and FIG. 2G, in the assembled lens assembly driving module 200, the extending structure 222 of the metal yoke 220 is located in the notch structure 241. Therefore, the extending structure 222 can be kept a certain distance with the notch structure 241. The certain distance is favorable for coating the damper precursor between the extending structure 222 and the notch structure 241 without disconnection.

In FIG. 2B, the magnet set 260 includes four magnets (reference numerals thereof are omitted). However, the present disclosure is not limited thereto. The magnet set 260 is for interacting with the coil 270 so as to generate the electromagnetic force. Therefore, the number and the arrangement of the magnets of the magnet set 260 can be adjusted according to practical demands.

In FIG. 2B, the elastic element includes the first elastic member 281 and the second elastic member 282. The first elastic member 281 is coupled with a portion of the lens unit 230 away from the holder 210, and the second elastic member 282 is coupled with a portion of the lens unit 230 close to the holder 210. Therefore, the lens unit 230 can be supported on the holder 210. Moreover, with the upper and lower assembly of the first elastic member 281 and the second elastic member 282, the tilt of the lens unit 230 can be prevented. In the 2nd embodiment, the elastic element has a total of two elastic members (i.e., the first elastic member 281 and the second elastic member 282). However, the present disclosure is not limited thereto. The elastic element is for providing the degree of freedom and the restoring force required by the movement of the lens unit 230. Accordingly, elastic elements which can provide the aforementioned function can be employed in the present disclosure. In other words, the number and the structure of the elastic members of the elastic element can be adjusted according to practical demands.

In FIG. 2B, the second elastic member 282 can include two springs (reference numerals thereof are omitted). The two springs are separated with each other, and the two springs are arranged on a same horizontal plane. Specifically, the two springs are electrically separated with each other. Therefore, the two springs can be employed as transmission path of current signals for the coil 270 (i.e. can be employed to send current signals required by the coil 270).

In FIG. 2D, the notch structure 241 and the damper agent 290 are corresponding to the through hole 221 and are not shielded by the metal yoke 220 along a direction parallel to the optical axis O. Furthermore, the damper agent 290 is formed by a damper precursor cured via a UV irradiation from the through hole 221.

In FIG. 2B and FIG. 2C, the lens assembly driving module 200 can include a sensing element 291 and another magnet set 292. The sensing element 291 is disposed on the holder 210. The magnet set 292 includes two magnets (reference numerals thereof are omitted), and the magnet set 292 is disposed at an end of the carrier 240 close to the holder 210. The sensing element 291 is corresponding to the magnet set 292. The sensing element 291 is for sensing the change of the magnetic field of the magnet set 292. The sensing element 291 can be a Hall effect element.

In FIG. 2N, a distance between a bottom 241a of the notch structure 241 and the extending structure 222 perpendicular to the optical axis O is d. In FIG. 2D, a number of the notch structure 241 is Nn, a number of the extending structure 222 is Ne, a number of the damper agent 290 disposed in the notch structure 241 is Na, a width of the extending structure 222 is Wy, and an included angle between the broadwise extending structure 223 and the extending structure 222 is θ. In FIG. 2G, a width of the notch structure 241 is Wb, and Wb does not include the width of the broadwise notch structure 242. In the 2nd embodiment, values of parameters d, Nn, Ne, Na, Wy, Wb, Wy/Wb and θ are listed in Table 2.

TABLE 2

| d[mm] | 0.32 | Wy [mm] | 1.00 |
|---|---|---|---|
| Nn | 4 | Wb [mm] | 1.18 |
| Ne | 4 | Wy/Wb | 0.85 |
| Na | 6 | θ [deg.] | 135 |

3rd Embodiment

Figure 3A:
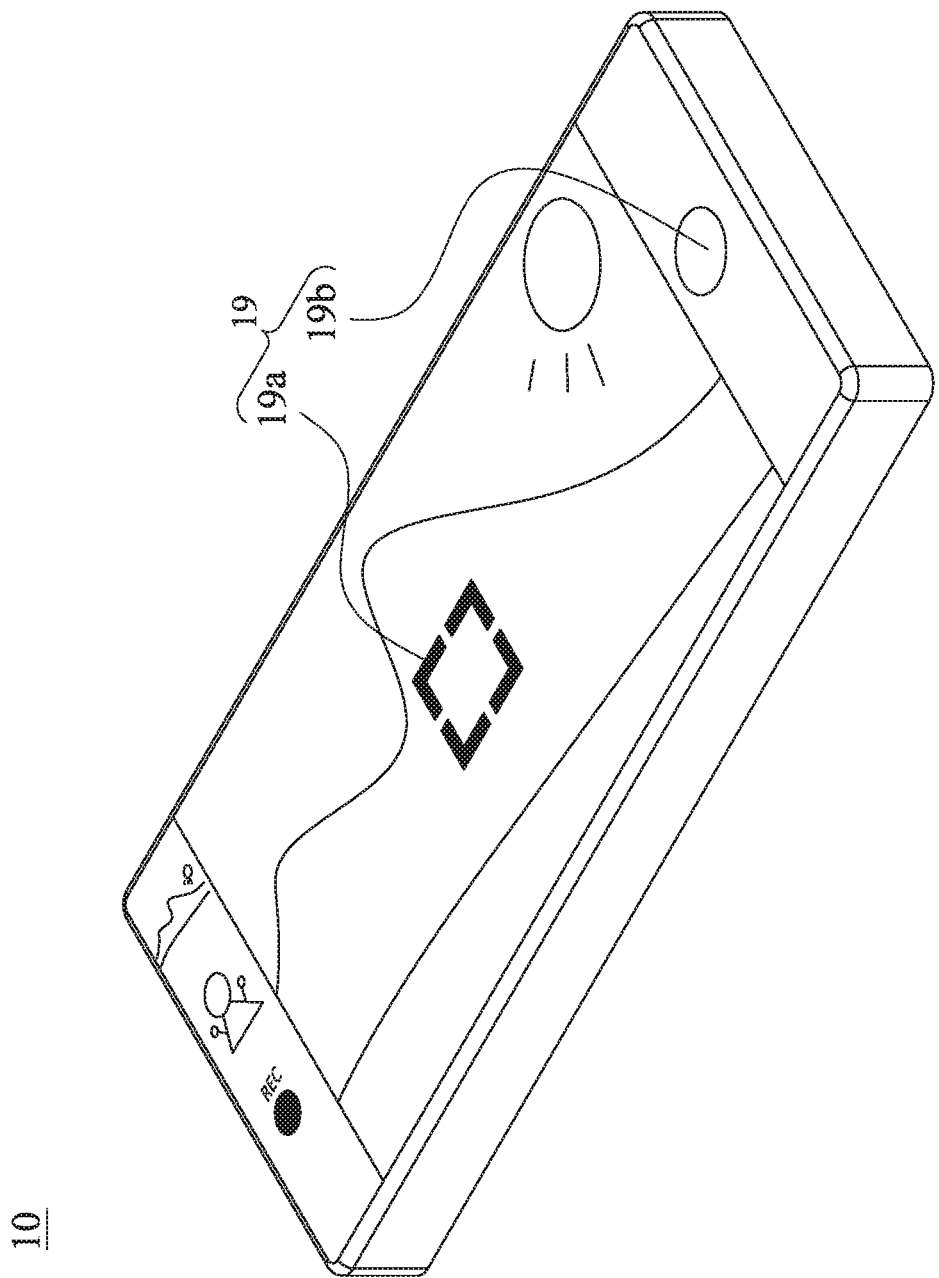
FIG. 3A is a schematic view showing a cell phone device according to the 3rd embodiment of the present disclosure.
Figure 3B:
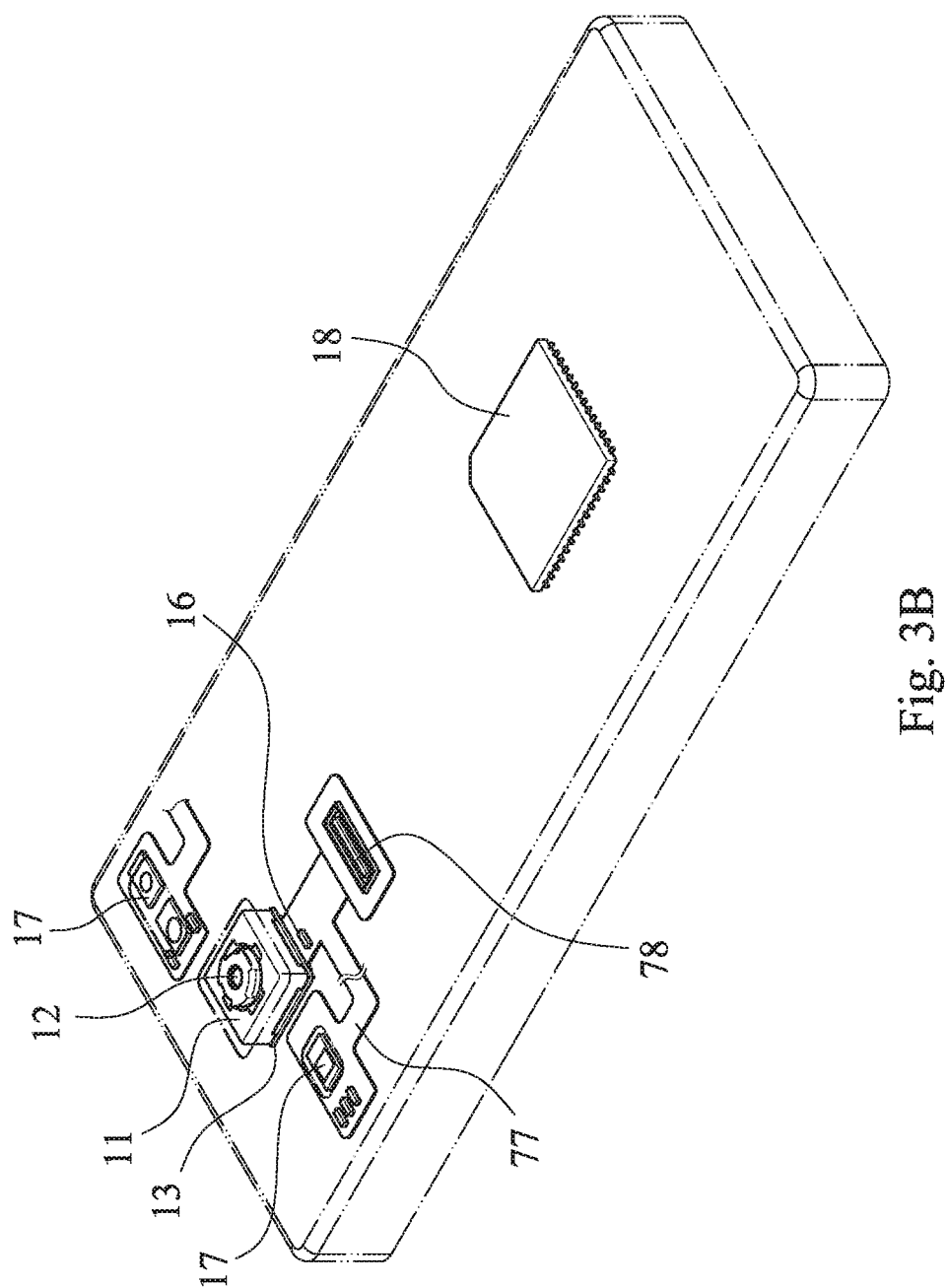
FIG. 3B is another schematic view of the cell phone device in FIG. 3A.
Figure 3C:
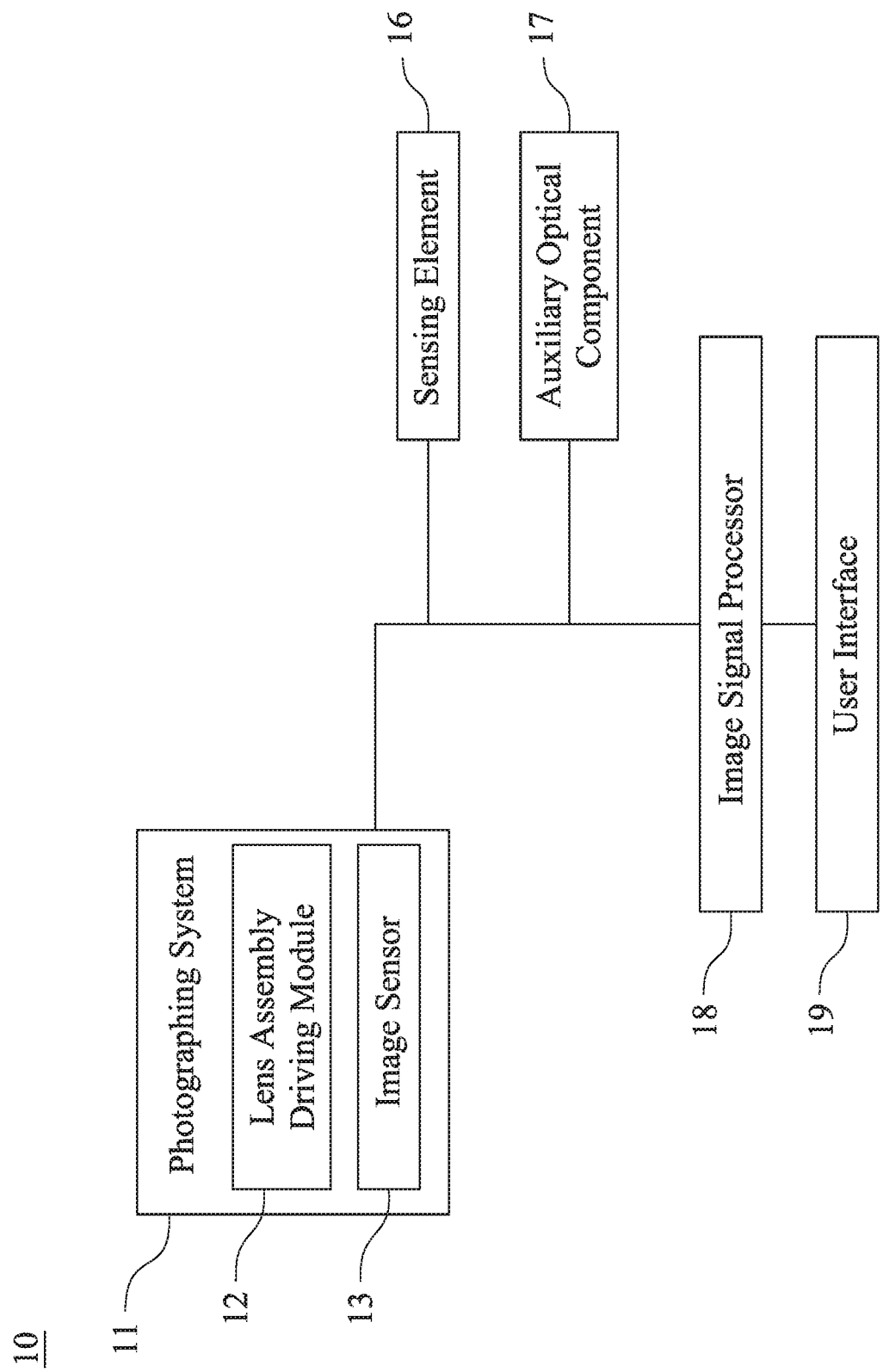
FIG. 3C is a block diagram of the cell phone device in FIG. 3A.

Please refer to FIG. 3A to FIG. 3C. FIG. 3A is a schematic view showing a cell phone device 10 according to the 3rd embodiment of the present disclosure. FIG. 3B is another schematic view of the cell phone device 10 in FIG. 3A. FIG. 3C is a block diagram of the cell phone device 10 in FIG. 3A. Particularly, FIG. 3A and FIG. 3B are schematic views related to a camera of the cell phone device 10, and FIG. 3C is the block diagram related to the camera of the cell phone device 10. As shown in FIG. 3A and FIG. 3B, the cell phone device 10 of the 3rd embodiment is a smart phone, wherein the cell phone device 10 includes a photographing system 11, and the photographing system 11 includes the lens assembly driving module 12 according to the present disclosure and an image sensor 13. The image sensor 13 is disposed on an image surface (not shown herein) of the lens assembly (its reference numeral is omitted) of the lens assembly driving module 12 for receiving an imaging light from the lens assembly. Therefore, the requirement of compactness for current electronic devices can be satisfied.

The cell phone device 10 can further include at least one sensing element 16, at least one auxiliary optical component 17, an image signal processor (ISP) 18, a user interface 19, a circuit board 77 and a connector 78, wherein the user interface 19 includes a touch screen 19a and a button 19b.

Furthermore, the user activates the capturing mode via the user interface 19 (the touch screen 19a or the button 19b) of the cell phone device 10. At this moment, the imaging light is converged on the image sensor 13 by the lens assembly driving module 12, and the electronic signal associated with image is output to the image signal processor 18.

The auxiliary optical component 17 can be a flash module for compensating color temperature, an infrared distance measurement component, a laser focus module, etc. The sensing element 16 can have functions for sensing physical momentum and kinetic energy, such as an accelerator, a gyroscope, a Hall effect element, to sense shaking or jitters applied by hands of the user or external environments. Accordingly, the functions of the lens assembly driving module 12 of the photographing system 11 can be enhanced to achieve the superior image quality. Furthermore, the cell phone device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the autofocus function of what you see is what you get.

Furthermore, as shown in FIG. 3B, the photographing system 11, the sensing element 16 and the auxiliary optical component 17 can be disposed on the circuit board 77 (the circuit board 77 is a flexible printed circuit board, FPC) and electrically connected with the associated components, such as the imaging signal processor 18, via the connector 78 to perform a capturing process. Since current electronic devices, such as smart phones, have a tendency of being compact. In the 3rd embodiment, the way of firstly disposing the photographing system 11 and related components on the flexible printed circuit board 77 and secondly integrating the circuit thereof into the main board of the cell phone device 10 via the connector 78 can satisfy the mechanical design of the limited space inside the cell phone device 10 and the layout requirements and obtain more margins. The autofocus function of the photographing system 11 can also be controlled more flexibly via the touch screen 19a of the cell phone device 10. In other embodiments (not shown herein), the sensing element 16 and the auxiliary optical component 17 can also be disposed on the main board of the cell phone device 10 or carrier boards of other types according to requirements of the mechanical design and the circuit layout.

In addition, the cell phone device 10 can further include but not be limited to a wireless communication unit, a control unit, a storage unit, a random access memory (RAM), a read-only memory (ROM), or a combination thereof.

4th Embodiment

Figure 4:
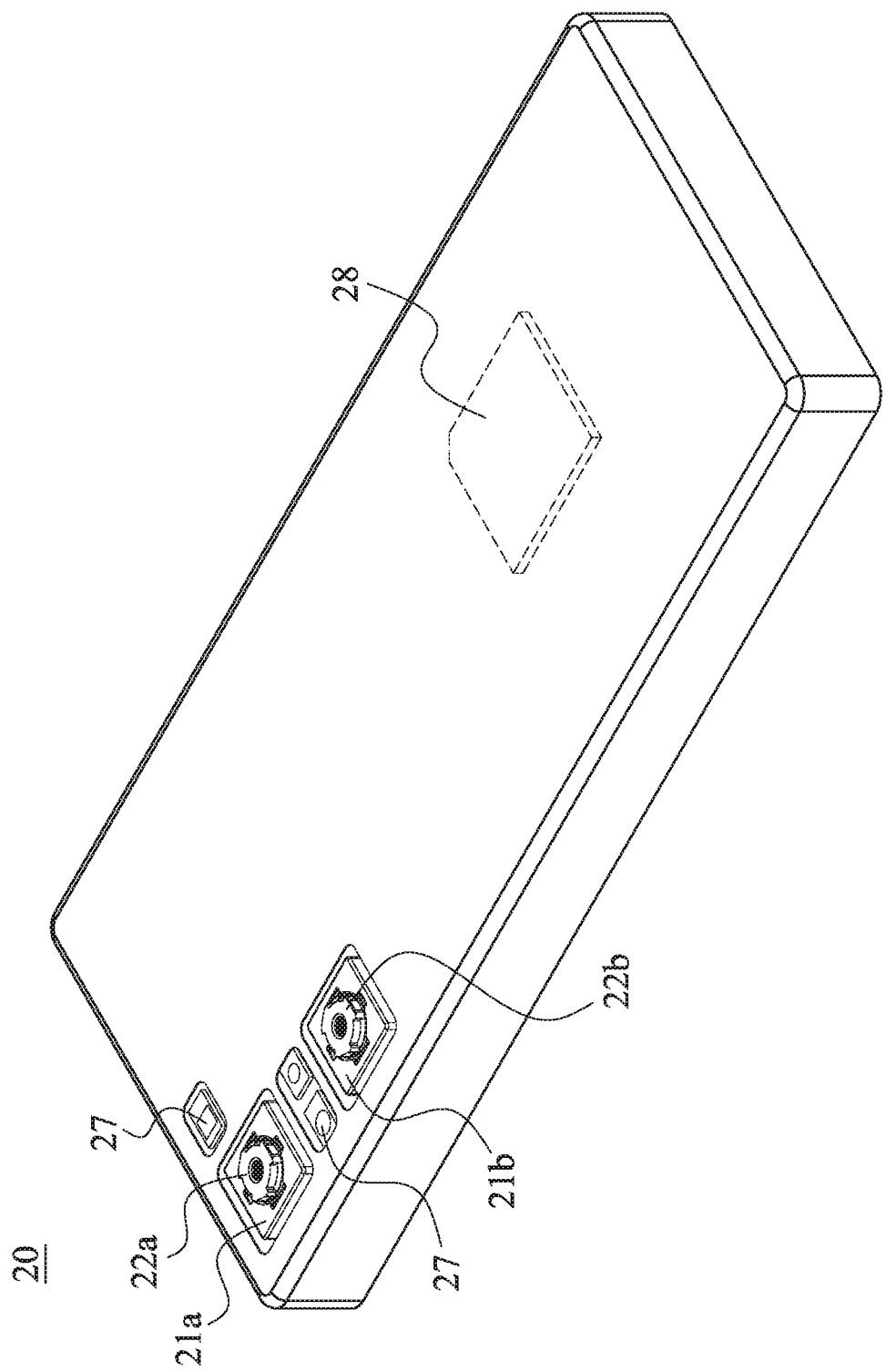
FIG. 4 is a schematic view of a cell phone device according to the 4th embodiment of the present disclosure.

FIG. 4 is a schematic view of a cell phone device 20 according to the 4th embodiment of the present disclosure. As shown in FIG. 4, the cell phone device 20 of the 4th embodiment is a smart phone, wherein the cell phone device 20 includes a photographing system 21a and a photographing system 21b. The photographing system 21a includes a lens assembly driving module 22a and an image sensor (not shown). The image sensor is disposed on an image surface (not shown) of the lens assembly (its reference numeral is omitted) of the lens assembly driving module 22a for receiving an imaging light from the lens assembly. The photographing system 21b includes a lens assembly driving module 22b and an image sensor (not shown). The image sensor is disposed on an image surface (not shown) of the lens assembly (its reference numeral is omitted) of the lens assembly driving module 22b for receiving an imaging light from the lens assembly.

Moreover, at least one of the lens assembly driving module 22a and the lens assembly driving module 22b is the lens assembly driving module according to the present disclosure. The optical properties of the lens assemblies of the lens assembly driving module 22a and the lens assembly driving module 22b can be the same or different. During the capturing process of the cell phone device 20, with the aid of the auxiliary optical component 27, two images can be obtained by the photographing system 21a and the photographing system 21b, then effects, such as a zoom effect and an exquisite effect, can be provided by the processing element (such as the imaging signal processor 28) of the cell phone device 20.

Details of the auxiliary optical component 27 can refer to that of the auxiliary optical component 17 of the 3rd embodiment, and are not described herein.

5th Embodiment

Figure 5:
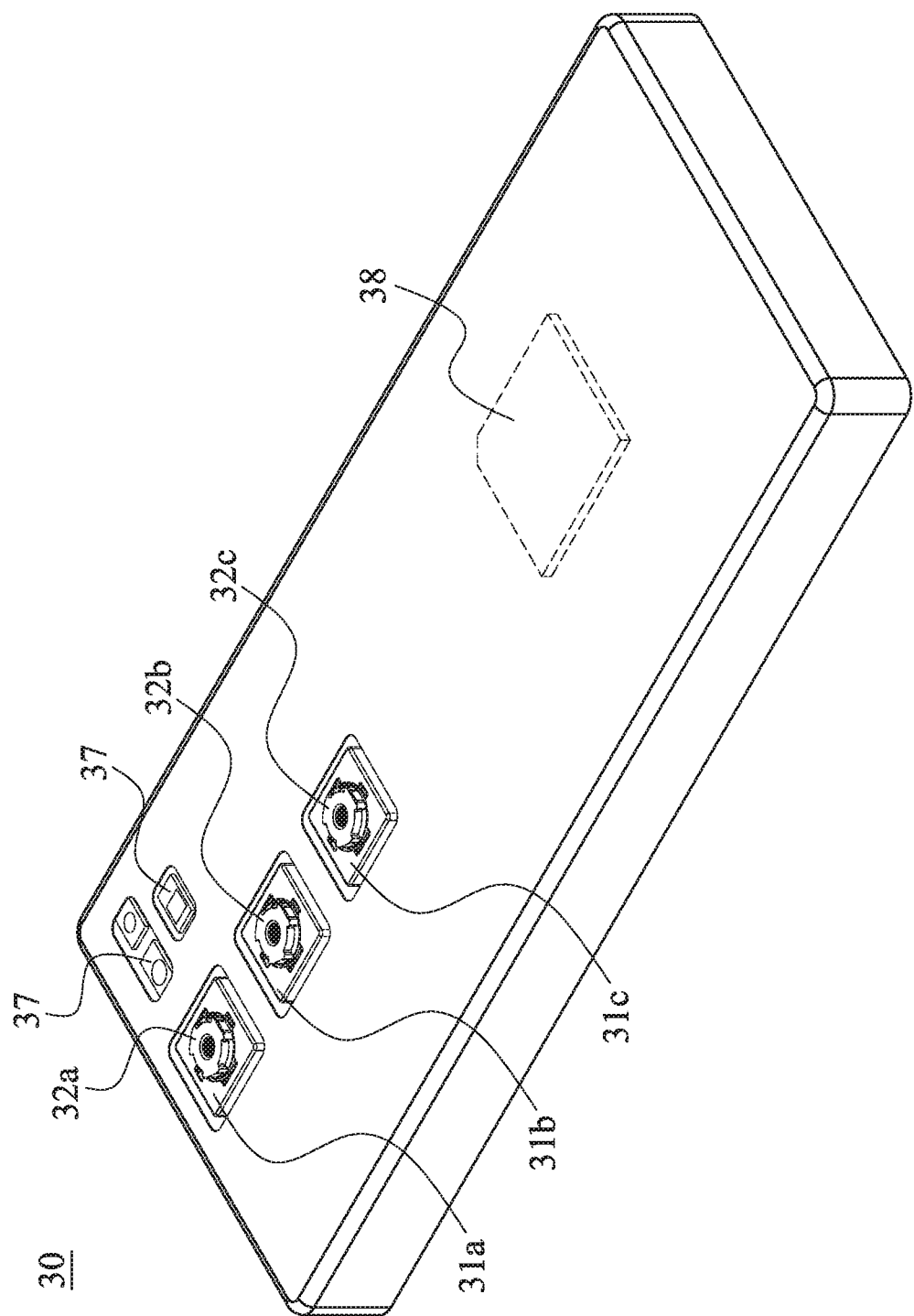
FIG. 5 is a schematic view of a cell phone device according to the 5th embodiment of the present disclosure.

FIG. 5 is a schematic view of a cell phone device 30 according to the 5th embodiment of the present disclosure. As shown in FIG. 5, the cell phone device 30 of the 5th embodiment is a smart phone, wherein the cell phone device 30 includes a photographing system 31a, a photographing system 31b and a photographing system 31c. The photographing system 31a includes a lens assembly driving module 32a and an image sensor (not shown). The image sensor is disposed on an image surface (not shown herein) of the lens assembly (its reference numeral is omitted) of the lens assembly driving module 32a for receiving an imaging light from the lens assembly. The photographing system 31b includes a lens assembly driving module 32b and an image sensor (not shown). The image sensor is disposed on an image surface (not shown) of the lens assembly (its reference numeral is omitted) of the lens assembly driving module 32b for receiving an imaging light from the lens assembly. The photographing system 31c includes a lens assembly driving module 32c and an image sensor (not shown). The image sensor is disposed on an image surface (not shown herein) of the lens assembly (its reference numeral is omitted) of the lens assembly driving module 32c for receiving an imaging light from the lens assembly.

Moreover, at least one of the lens assembly driving module 32a, the lens assembly driving module 32b and the lens assembly driving module 32c is the lens assembly driving module according to the present disclosure. The optical properties of the lens assemblies of the lens assembly driving module 32a, the lens assembly driving module 32b and the lens assembly driving module 32c can be the same or different. During the capturing process of the cell phone device 30, with the aid of the auxiliary optical component 37, three images can be obtained by the photographing system 31a, the photographing system 31b and the photographing system 31c, then effects, such as a zoom effect and an exquisite effect, can be provided by the processing element (such as the imaging signal processor 38) of the cell phone device 30.

Details of the auxiliary optical component 37 can refer to that of the auxiliary optical component 17 of the 3rd embodiment, and are not described herein.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A lens assembly driving module, comprising:
a holder having an opening;
a metal yoke coupled with the holder and comprising:
a through hole corresponding to the opening of the holder; and at least one extending structure disposed around the through hole, wherein the extending structure extends along a direction from the through hole to the holder;

a lens unit movably disposed in the metal yoke and comprising:

an optical axis corresponding to the through hole;

at least one notch structure disposed in an outer peripheral area of the lens unit and corresponding to the extending structure;

a carrier movably disposed in the metal yoke, wherein the notch structure is disposed in an outer peripheral area of the carrier, and the carrier comprises:

an object-side portion having an object-side central hole; and at least three inner surfaces, wherein each of the inner surfaces has a diameter, the diameters of the inner surfaces are different from each other, and each of the diameters of the inner surfaces is greater than a diameter of the object-side central hole; and a lens assembly, wherein the optical axis is defined by the lens assembly, the optical axis is corresponding to the object-side central hole, and the lens assembly comprises:

at least three lens elements, each of the lens elements has an outer diameter, the outer diameters of the lens elements are different from each other, the lens assembly is coupled in the carrier, and a movement of the lens assembly relative to the holder is according to a movement of the carrier;

a magnet set disposed in the metal yoke;

a coil disposed at an exterior of the lens unit and corresponding to the magnet set;

at least one elastic element coupled with the lens unit and the holder; and at least one damper agent disposed between the extending structure of the metal yoke and the notch structure of the lens unit, wherein the damper agent is applied to damp a movement of the lens unit;

wherein a number of the damper agent disposed in the notch structure is Na, and the following conditions are satisfied:

$2 \leq Na \leq 12$; and

Na is an even number.

2. The lens assembly driving module of claim 1, wherein the notch structure and the damper agent are corresponding to the through hole and are not shielded by the metal yoke along a direction parallel to the optical axis.

3. The lens assembly driving module of claim 2, wherein the damper agent is formed by a damper precursor cured via a UV irradiation from the through hole.

4. The lens assembly driving module of claim 3, wherein the extending structure is formed in a flat shape.

5. The lens assembly driving module of claim 1, wherein the elastic element comprises a first elastic member and a second elastic member, the first elastic member is coupled with a portion of the lens unit away from the holder, and the second elastic member is coupled with a portion of the lens unit close to the holder.

6. The lens assembly driving module of claim 5, wherein the second elastic member comprises two springs, the two springs are separated with each other, and the two springs are arranged on a same horizontal plane.

7. The lens assembly driving module of claim 1, wherein the object-side portion of the carrier comprises an annular side wall surrounding the object-side central hole, the annular side wall comprises a tip end structure formed by two inclined planes, and an included angle between each of the inclined planes and the optical axis is greater than 0 degrees and less than 90 degrees.

8. The lens assembly driving module of claim 1, wherein a portion of the carrier surrounded by the coil is disposed inside the metal yoke, and the object-side portion of the carrier is exposed to an outside of the metal yoke.

9. The lens assembly driving module of claim 1, wherein a number of the notch structure is Nn, a number of the extending structure is Ne, and the following conditions are satisfied:

$2 \leq Nn \leq 6$; and $Nn = Ne$.

10. The lens assembly driving module of claim 1, wherein a width of the extending structure is Wy, a width of the notch structure is Wb, and the following condition is satisfied:

$0.4 < Wy/Wb < 1.0$.

11. The lens assembly driving module of claim 1, wherein the extending structure comprises a broadwise extending structure, the notch structure comprises a broadwise notch structure, and the broadwise extending structure is corresponding to the broadwise notch structure.

12. The lens assembly driving module of claim 11, wherein a portion of the broadwise notch structure close to the through hole of the metal yoke tapers along a direction toward the holder.

13. The lens assembly driving module of claim 11, wherein an included angle between the broadwise extending structure and the extending structure is θ, and the following condition is satisfied:

95 degrees $< \theta <$ 175 degrees.

14. A photographing system, comprising:
the lens assembly driving module of claim 1.

15. A cell phone device, comprising:
the photographing system of claim 14.

* * * * *